United States Patent
Keever

(10) Patent No.: US 9,475,716 B2
(45) Date of Patent: Oct. 25, 2016

(54) METHODS FOR IMPROVING LIQUID QUALITY IN A RESERVOIR

(71) Applicant: Christopher Scott Keever, Peachtree City, GA (US)

(72) Inventor: Christopher Scott Keever, Peachtree City, GA (US)

(*) Notice: Subject to any disclaimer, the term of this patent is extended or adjusted under 35 U.S.C. 154(b) by 639 days.

(21) Appl. No.: 14/024,863

(22) Filed: Sep. 12, 2013

(65) Prior Publication Data

US 2014/0077397 A1 Mar. 20, 2014

Related U.S. Application Data

(60) Provisional application No. 61/699,955, filed on Sep. 12, 2012, provisional application No. 61/824,922, filed on May 17, 2013.

(51) Int. Cl.
*C02F 7/00* (2006.01)
*A01K 63/04* (2006.01)
*C02F 103/00* (2006.01)
*C02F 3/08* (2006.01)

(52) U.S. Cl.
CPC ............... *C02F 7/00* (2013.01); *A01K 63/042* (2013.01); *C02F 3/087* (2013.01); *C02F 2103/007* (2013.01); *C02F 2209/008* (2013.01); *Y02W 10/15* (2015.05); *Y02W 10/37* (2015.05)

(58) Field of Classification Search
CPC combination set(s) only.
See application file for complete search history.

(56) References Cited

U.S. PATENT DOCUMENTS

| | | | | |
|---|---|---|---|---|
| 5,868,091 | A * | 2/1999 | Gross | B63B 1/121 114/61.1 |
| 2005/0142011 | A1* | 6/2005 | Tormaschy | B01F 3/04609 417/423.15 |
| 2007/0039878 | A1* | 2/2007 | Roberts | B01F 3/04609 210/605 |
| 2008/0000841 | A1* | 1/2008 | Mitchell | B01F 3/04113 210/747.5 |
| 2012/0228216 | A1* | 9/2012 | Gavrieli | C02F 3/08 210/615 |
| 2013/0220944 | A1* | 8/2013 | Galletta, Jr. | B01F 3/0451 210/758 |

* cited by examiner

*Primary Examiner* — Duane Smith
*Assistant Examiner* — Adam W Bergfelder
(74) *Attorney, Agent, or Firm* — Withers & Keys, LLC

(57) ABSTRACT

Liquid treatment systems, components of liquid treatment systems, and methods of treating liquids are disclosed.

20 Claims, 42 Drawing Sheets

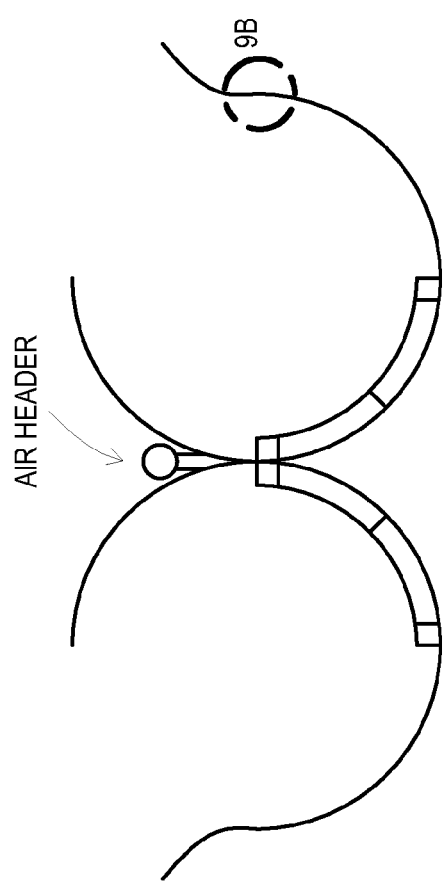
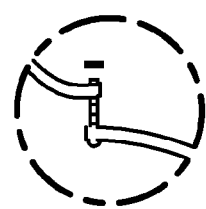
FIG. 9A
FIG. 9B

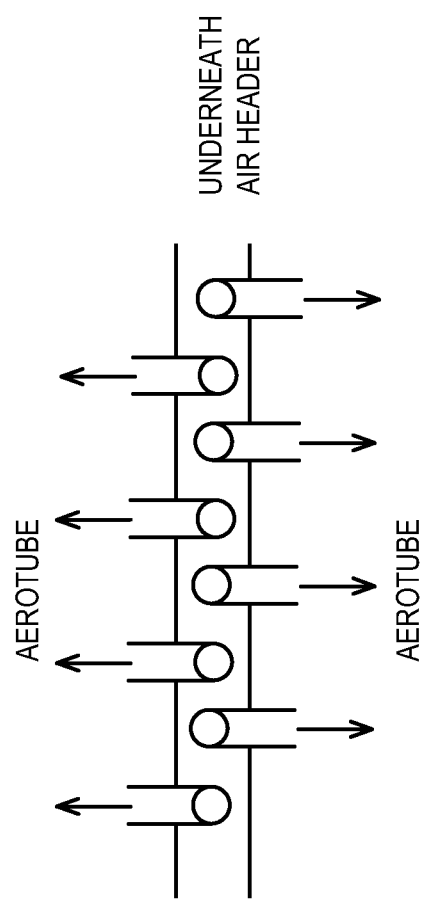

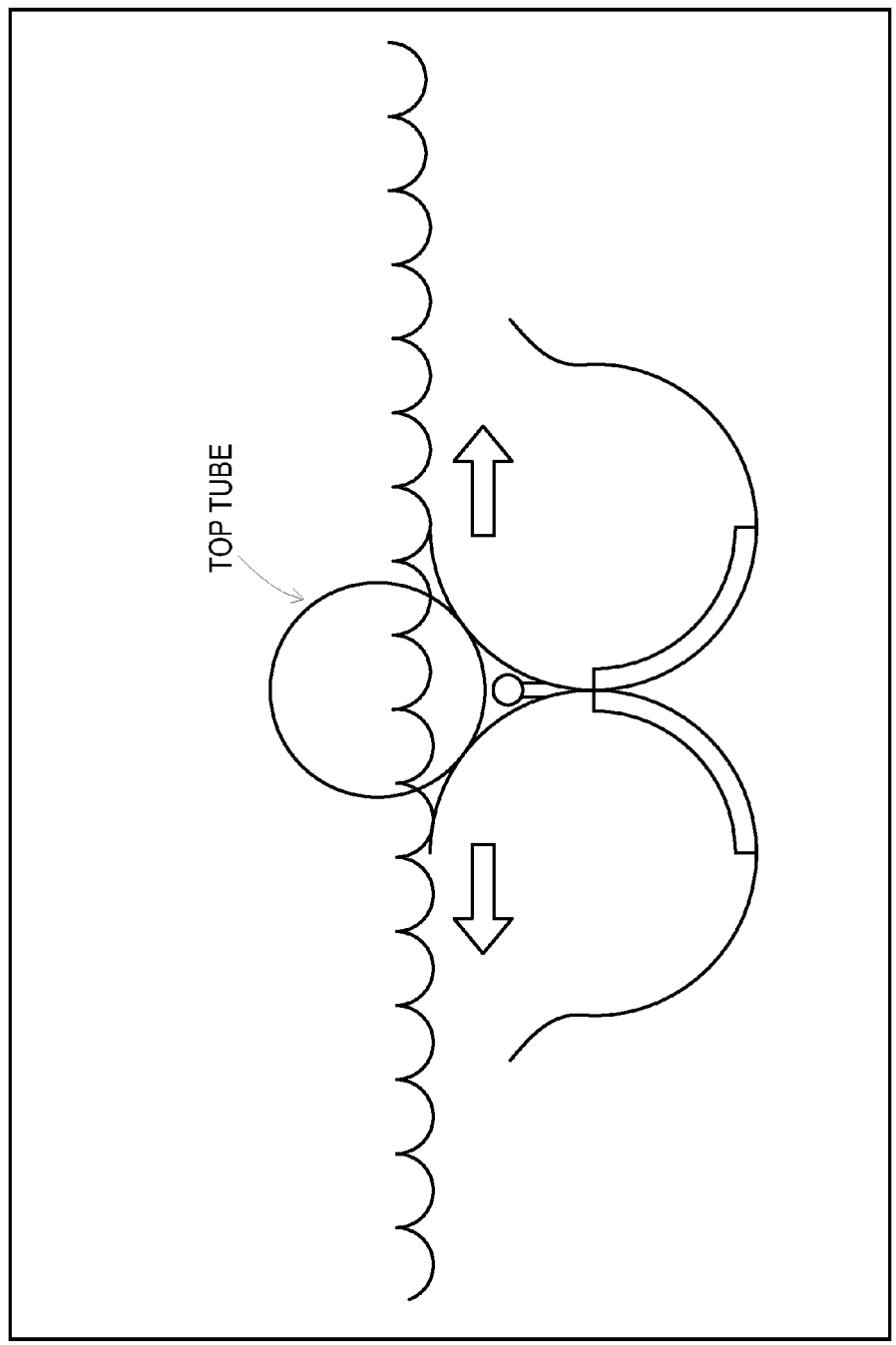

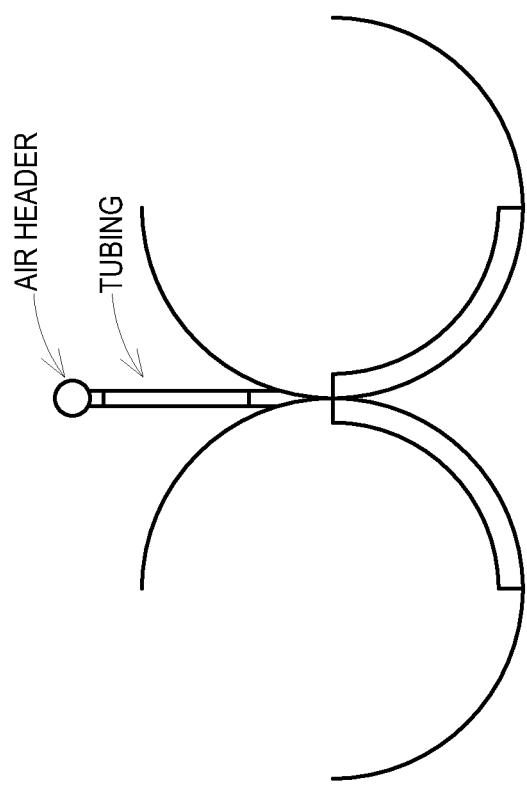

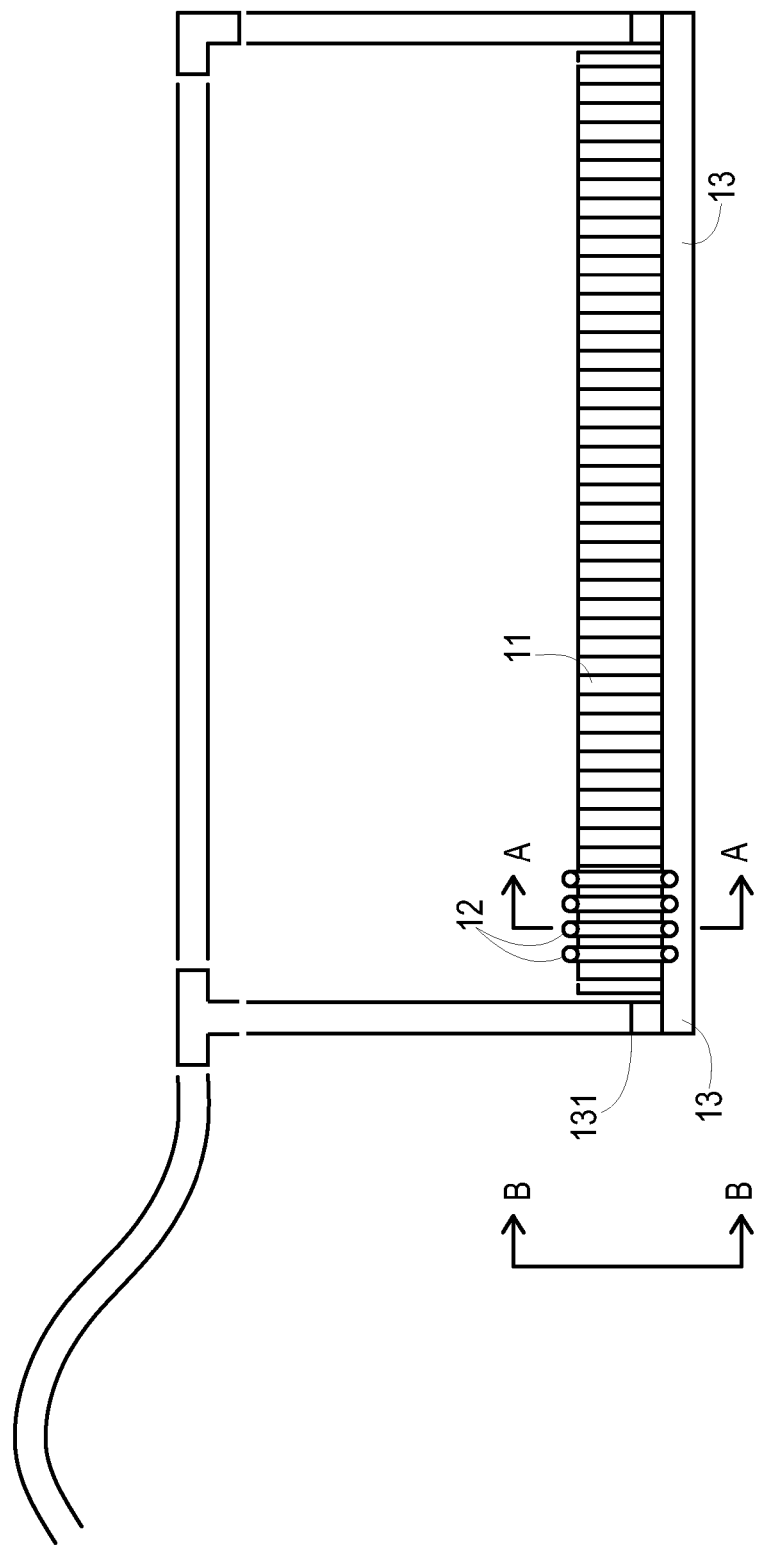

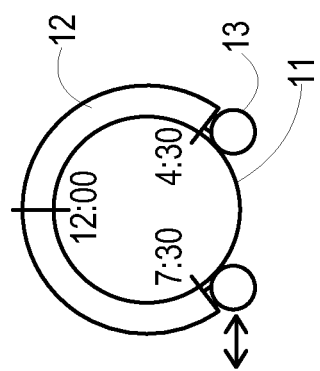

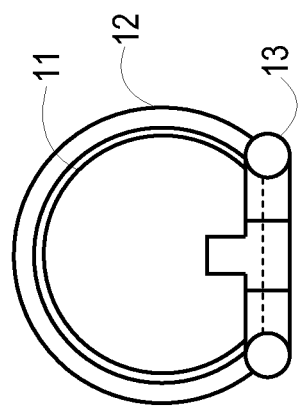

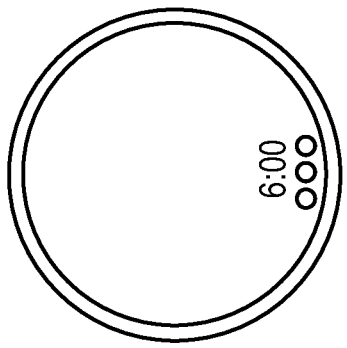

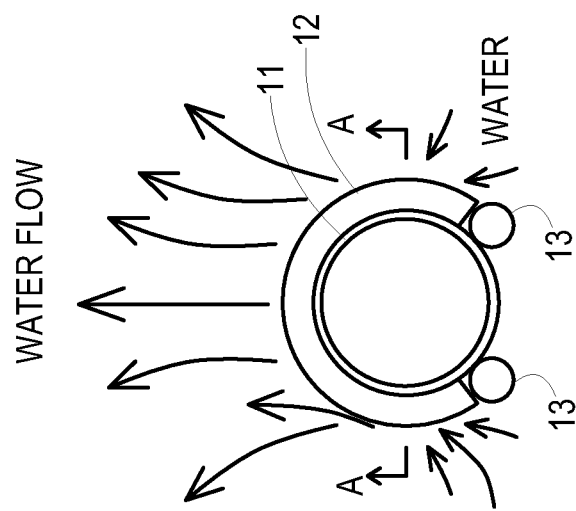

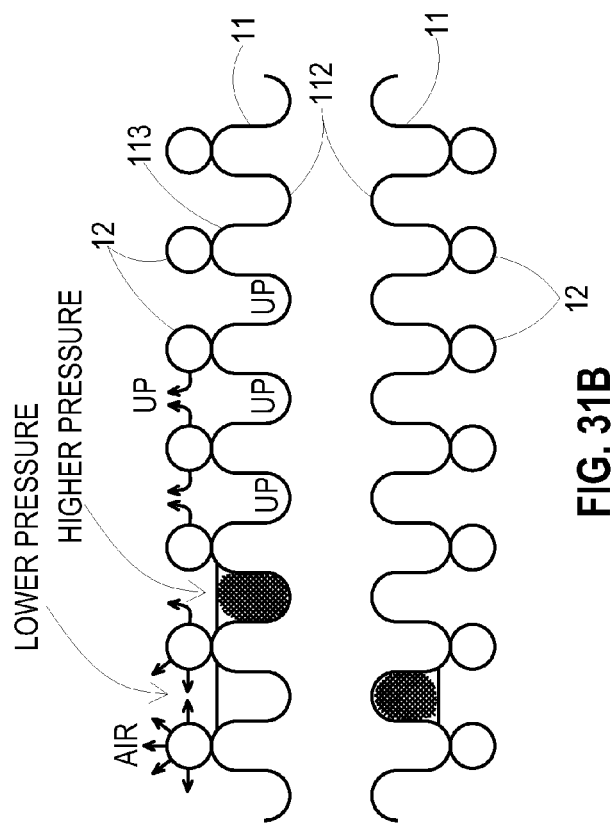
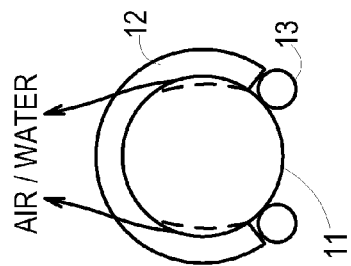

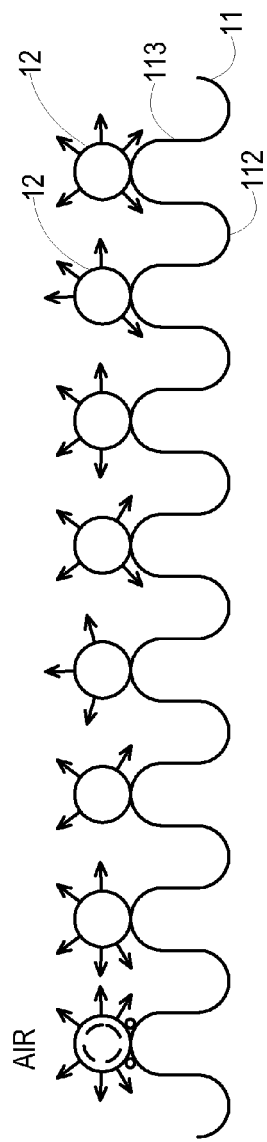
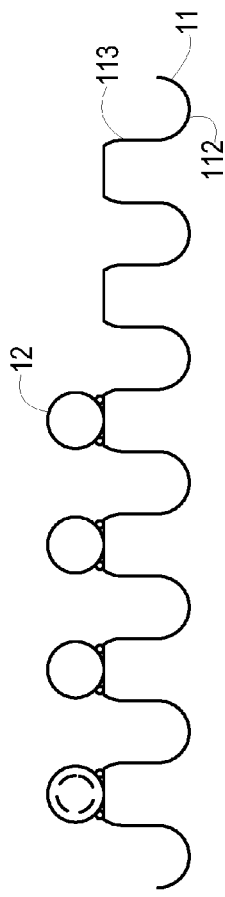
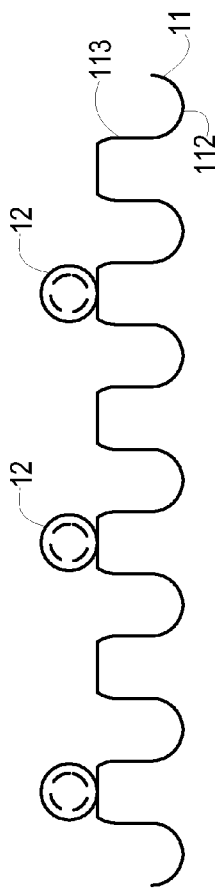
FIG. 33A
FIG. 33B
FIG. 33C

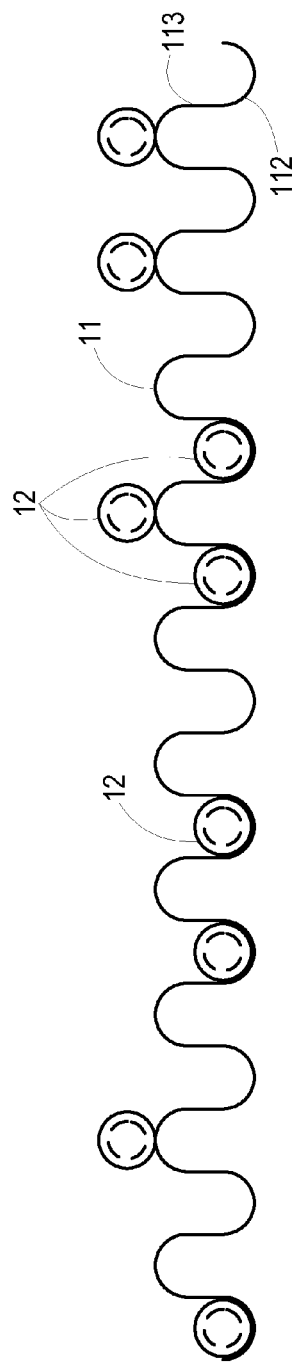
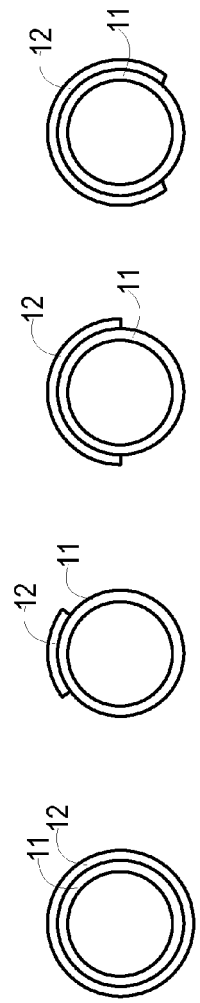
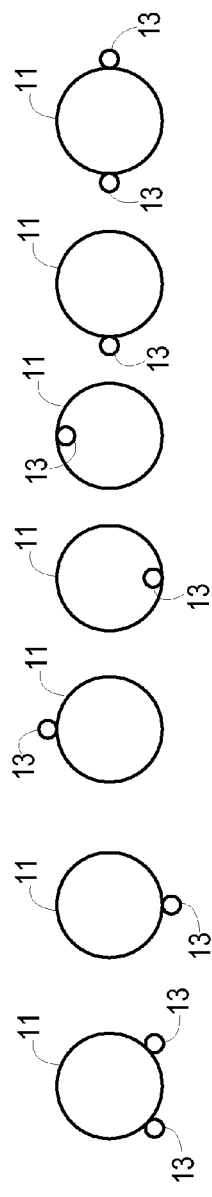
FIG. 34A
FIG. 34B
FIG. 34C

METHODS FOR IMPROVING LIQUID QUALITY IN A RESERVOIR

CROSS-REFERENCE TO RELATED APPLICATIONS

This patent application claims the benefit of priority to (i) U.S. provisional patent application Ser. No. 61/699,955 entitled "METHODS FOR IMPROVING WATER QUALITY IN A RESERVOIR" filed on Sep. 12, 2012, and (ii) U.S. provisional patent application Ser. No. 61/824,922 entitled "METHODS FOR IMPROVING WATER QUALITY IN A RESERVOIR" filed on May 17, 2013, the subject matter of both of which is incorporated herein in its entirety.

TECHNICAL FIELD OF THE INVENTION

The present invention is directed to liquid treatment systems, components suitable for use in liquid treatment systems, and methods of treating liquids.

BACKGROUND OF THE INVENTION

Water quality in a reservoir is affected by many things. Influent contaminants, throughput, detention time, stratification, temperatures, depth, morphology, bathometry, rainfall, wind, turnover, toxins, sunlight, microbes, aquatic life, plants, organics, metals, outfall characteristics, and surface area are just some of the countless factors that contribute to its quality. Each reservoir establishes its own limnological balance based on these conditions, but oftentimes supplemental or external input is required to maintain a desirable reservoir water quality. Examples of supplemental or external inputs include chemicals, aeration, mixing, and many other inputs.

Reservoirs can exist in many different forms. They can be ponds or lakes where water is stored for recreational or drinking water purposes. They can be lagoons where treatment of wastewater is performed. They can even be small like a clarification basin in a water treatment plant used to settle out solids and debris. Different forms of reservoirs experience different challenges in establishing or maintaining optimal water quality. Lastly, reservoirs can contain many different liquids. Oftentimes it is water, but in other instances reservoirs can contain liquid chemicals and other liquid variations.

One of the most important elements of a reservoir is its water-air interface. The surface of a reservoir is a very dynamic spot where evaporation occurs, cooling/heating occurs, sunlight is transmitted and reflected, oxygenation occurs, photosynthesis occurs, waves are generated, gases are released, plant life and weeds grow, UV disinfection occurs, birds rest and feed, and so forth. The condition of a reservoir's surface has significant impact on the water quality and characteristics beneath. For example, if the surface in a wastewater treatment lagoon is covered by Duckweed (i.e., Limnoideae), sunlight can't get through, photosynthesis is hindered, and treatment efficiencies deteriorate. If there is a strong wind across a lake, waves are generated and the lake gets mixed. If the surface is covered in ice, gases in the lake can't get out, oxygen and sunlight can't get in, and conditions change dramatically. The surface is where oil finds itself in an oil spill. Considering how dynamic and important the water-air interface is, it would be highly beneficial if there was a way to control or influence the activity taking place across it. Doing so successfully could have a dramatic impact on regulating a reservoir's overall water quality.

Further, debris on a water surface can create problematic conditions within the water body. Water bodies rely heavily on algae for oxygen generation and algae rely on sunlight. If sunlight is blocked from getting to the algae within the water body, the available oxygen is quickly taken up, aerobic microbes die off, and septic conditions can develop. Septic conditions cause a variety of problems and are usually not desirable.

Lagoon wastewater treatment systems are examples of water bodies that rely heavily on photosynthesis. These systems have a delicate limnological balance between nutrients, microbes, sunlight, mixing, and so forth. Contaminants such as ammonia and the biological oxygen demand within wastewater are typically processed and addressed by aerobic bacteria (heterotrophs, nitrobacter, etc.). If there is insufficient oxygen, there can be insufficient nitrification and BOD removal, and effluent permits can be violated. It is therefore important to ensure appropriate photosynthesis occurs within a lagoon treatment system.

Duckweed (i.e., Limnoideae) and other floating weeds can flourish in the presence of nutrients and sunlight, particularly in warm, stagnant environments like lagoon wastewater treatment systems. These floating weeds grow quickly and can cover a lagoon in little time. Sunlight is blocked and before long, there is insufficient oxygen present in the lagoon and effluent water quality deteriorates. Duckweed is not all bad, however. It is very effective in removing nutrients, so it would therefore be advantageous to harness the duckweed in a lagoon for treatment purposes yet "corral" it in a way so as to not inhibit photosynthesis.

In wastewater treatment, floating, moving media may be utilized to enhance treatment. Known floating media provide a haven for attached-growth biomass and can contribute to significantly greater processing rates. The media moves throughout a basin usually in the presence of air and is usually restrained by some sort of screen. By having the media house biomass, long sludge retention times can be achieved, which can be beneficial to treatment. The fact that the media moves throughout the basin and collides with other media is also beneficial as it allows for sloughing of old biomass and exposes the biomass to nutrients throughout the water column.

Even with known floating media, lagoon treatment systems can experience difficulty meeting effluent water quality requirements. Most every wastewater plant has a permit from a regulatory agency that requires their effluent be of a certain water quality. Sometimes it can be difficult to achieve permit requirements for Total Suspended Solids (TSS), Biological Oxygen Demand (BOD), pH, Total Kehedal Nitrogen (TKN), Ammonia, and so forth. It would therefore be beneficial for a lagoon treatment system to have the capability to achieve enhanced treatment, for example, via floating media, when and if needed.

In addition, aeration of water (liquid), for example, in a reservoir, is also an important step to ensure water quality. Aeration of water is accomplished in many ways. Two common methods of forced aeration are mechanical floating aerators and fixed-bottom aerators. Floating aerators sometimes fling water up into the air. Other times they force air down into the water from above. Fixed-bottom aerators are typically fine- or coarse-bubble aerators that are typically installed onto the bottom of a basin. These devices release air compressed from a blower into the water column and as the air rises, it oxygenates the water. Countless devices have been used to accomplish mechanical aeration of water.

Floating aerators can be burdensome and expensive to operate and maintain. Usually they are mechanical devices involving motors and gearboxes, which need typical manufacturer scheduled maintenance performed on them to ensure reliability. Because they are typically heavy mechanical devices located out in the water, they are typically extracted from the basins with cranes or heavy lifting equipment so maintenance can be accomplished on the shore. These devices can have water pumped through them and if there are rags and other debris present in the water, they can become clogged and inoperable—again requiring extraction from the basin for shore maintenance.

Fixed-bottom aerators also require maintenance, which means they require access. To access fixed-bottom aerators, water must be drained from the tank. Taking a basin out of service to enact maintenance on aeration equipment can create serious operational challenges for plants. Having a basin off-line can cause greater loading to the other basins in operation, which can make treating the water more challenging. Not meeting treatment goals can cause violations, trigger environmental fines, and contaminate the environment.

The prior art provides numerous known devices for treating liquid reservoirs, however, known devices have one or more shortcomings. The following known devices are worth noting:

Circulators/Solar Circulators—Circulation technologies (Solar powered circulation technologies) can be used to improve water quality in a reservoir. It is also used in wastewater lagoons to achieve mixing. This would not achieve the desired effect because these devices attempt to circulate layers of water, one on top of the other, in opposing directions. Also, as these devices are placed in a reservoir, currents are produced radially outward from a unit towards the other units placed in the reservoir, which contradict the movement of water. This causes a loss or reduction in efficiency. These devices attempt to control the limnological condition of a reservoir by obstructing the movement of microbes and facilitating greater exposure of microbes to predatory microorganisms, amongst other techniques. In any case, these circulators do not attempt to control the activity of the surface of a reservoir, but rather they attempt to enact specific movement of water below it. (In contrast, systems and methods of the present invention specifically target the activity of the surface, and then the sunlit depths below, and then it can selectively introduce nutrients to this treatment zone.) Solar circulators do not control the surface, and do not attempt to harness what goes on in just the sunlit depths of a reservoir, and do not selectively introduce nutrients on a select, periodic, or as-needed basis to achieve a certain water condition in the sunlit depths. Further, wave creation is not a goal or targeted output of solar circulation. Enacting waves at the surface, and waves of a specific height, period, or shape, are not required or necessarily desired in circulators. (In contrast, systems and methods of the present invention can manipulate light entry into a basin to affect limnology.)

Brush Aerators—This is a technology that spins around and flings water up in the air to add oxygen to the water. It flings it up in a certain direction, which can produce currents in the water as it comes down onto the surface. However, these devices aerate and mix water on an "unconfined" basis, and with no strategy within the reservoir. They simply add oxygen and mix water around it. (In contrast, systems and methods of the present invention can harness the sunlit depths of a reservoir into a specific current and treatment zone, brush aerators are aeration and mixing devices.) They also do nothing to manipulate light entry into the basin to affect biological activity.

Solar Shaking Devices—This is a solar powered shaking device that creates ripples in water for aesthetic purposes. However, this cosmetic device is not intended to, nor does it effectively treat water beneath it. (In contrast, systems and methods of the present invention can produce waves of a sufficient size, so as to affect light penetration into the water and photosynthesis, and heat transfer in the water, and is activated selectively based on environmental conditions to positively affect water characteristics.) The solar shaker shakes the surface of the water, producing ripples, with solar energy only, and is not activated according to any algorithm or strategy to affect the water characteristics beneath it.

Efforts continue to further develop liquid treatment systems, components for use in liquid treatment systems, and methods of effectively and efficiently treating liquids. For example, efforts continue to further develop water aeration devices, in particular, water aeration devices that enable one or more benefits such as (1) the water aeration device is accessible from the shore, (2) the water aeration device is easily extracted from a reservoir, (3) maintenance on the water aeration device does not require a liquid/water basin to be dewatered/drained, (4) the water aeration device would be designed to minimize or eliminate clogging from debris, and (5) the water aeration device could be maintained/serviced while other aerators continue to remain in operation.

SUMMARY OF THE INVENTION

The present invention relates to liquid (e.g., water) treatment systems, components suitable for use in liquid (e.g., water) treatment systems, and methods of treating liquids (e.g., water). The present invention further relates to water treatment systems, components suitable for use water treatment systems, and methods for improving water quality in a basin of water, for example, by enacting waves and/or currents within a treatment zone of the basin of water (e.g., within a basin's sunlit depths).

In one exemplary embodiment of the present invention, the method of treating a liquid comprises a method of treating a reservoir of water, wherein the method comprises the steps of: identifying a reservoir requiring treatment; positioning at least one current inducing apparatus into said reservoir; allowing said current inducing apparatus to create movement of water at the surface of the reservoir, and beneath the surface to a depth substantially limited to the depth of sunlight penetration, thereby forming a sunlit treatment zone; monitoring said reservoir for a desired outcome; introducing water and nutrients from beneath this treatment zone up into the treatment zone on an as-desired basis to achieve a preferred overall reservoir water quality; and ceasing said introduction of water and/or nutrients into the treatment zone when said desired outcome is achieved, and/or ceasing operation of current inducing device when said desired outcome is achieved.

In another exemplary embodiment of the present invention, the method of treating a liquid comprises a method of treating a reservoir of water, wherein the method comprises the steps of: identifying a reservoir requiring treatment; positioning at least one wave inducing apparatus into said reservoir; monitoring the water quality characteristics of the reservoir; allowing said wave inducing apparatus to create waves of sufficient size/amplitude to affect light penetration and/or heat transfer into the reservoir; allowing said wave inducing apparatus to create waves of sufficient size/amplitude at specific times and or environmental conditions to facilitate a desired water quality in the reservoir; and ceasing operation of wave producing apparatus when desired water quality in the reservoir is achieved.

In a further exemplary embodiment of the present invention, the method of treating a liquid comprises generating a current in the liquid reservoir having a reservoir depth $D_r$, wherein the current (i) travels in a non-linear path across an upper surface of the liquid reservoir, and (ii) moves liquid within a liquid treatment zone having a depth $D_{tz}$ with depth $D_{tz}$ being less than reservoir depth $D_r$.

In yet a further exemplary embodiment of the present invention, the method of treating a liquid comprises creating waves along an upper surface of the liquid reservoir, the waves having a wave height relative to the upper surface, wherein the liquid reservoir has a reservoir depth $D_r$, and the waves move liquid within a liquid treatment zone having a depth $D_{tz}$ with depth $D_{tz}$ being less than reservoir depth $D_r$.

The present invention is further directed to liquid (e.g., water) treatment systems, and components suitable for use in liquid (e.g., water) treatment systems. In one exemplary embodiment of the present invention, the component suitable for use in a liquid (e.g., water) treatment system comprises a float (e.g., a floating media device) used to enhance mixing effect of rising water/air mixture as described herein. The float may be capable of (i) providing one or more nutrients into the liquid reservoir, (ii) transferring heat to the liquid reservoir, (iii) monitoring one or more properties of the liquid reservoir, (iv) absorbing solar energy for later use via one or more solar panels thereon, (v) moving via a sail-like member extending above the upper surface of the liquid reservoir, or (vi) any combination of (i) to (v).

In another exemplary embodiment of the present invention, the component suitable for use in a liquid (e.g., water) treatment system comprises a current-producing devices/apparatus as described herein.

In yet another exemplary embodiment of the present invention, the component suitable for use in a liquid (e.g., water) treatment system comprises a wave-generating devices/apparatus as described herein.

In yet another exemplary embodiment of the present invention, the component suitable for use in a liquid (e.g., water) treatment system comprises a gas-distributing apparatus suitable for use in a liquid reservoir, wherein the gas-distributing apparatus comprises: a base substrate having a base substrate length, a base substrate width substantially perpendicular to said base substrate length, and a base substrate outer surface; one or more gas-supplying manifolds extending (i) proximate to or in contact with and (ii) along said base substrate length of said base substrate, each of said gas-supplying manifolds comprising at least one gas-supplying manifold inlet and at least one gas-supplying manifold outlet; and two or more air-permeable tubular members positioned along said base substrate outer surface in a substantially parallel configuration relative to each another, each of said air-permeable tubular member being in fluid communication with said at least one gas-supplying manifold outlet of said one or more gas-supplying manifolds. In some desired embodiments, the base substrate comprises a base tubular member (e.g., a plastic pipe or a plastic corrugated pipe).

These and other features and advantages of the present invention will become apparent after a review of the following detailed description of the disclosed embodiments and the appended claims.

BRIEF DESCRIPTION OF THE DRAWINGS

FIG. 9 depicts a cross-section of an exemplary current creating machine;
FIG. 10 depicts a way to add ballast to an exemplary current creating machine;
FIGS. 27-34 illustrate various embodiments of the present invention, and correspond to pages 1-8 of the attached "10151-0001USP2-AerSled Concept" pdf document.

DETAILED DESCRIPTION OF THE INVENTION

The following detailed description is of the best currently contemplated modes of carrying out exemplary embodiments of the present invention. The description is not to be taken in a limiting sense, but is made merely for the purpose of illustrating the general principles of the present invention, since the scope of the present invention is best defined by the appended claims.

Broadly, an embodiment of the present invention provides a method for optimizing reservoir water quality whereby a reservoir's upper sunlit layers are harnessed hydraulically into a "treatment zone" and the transport of nutrients, sunlight, floating debris, and other inputs are regulated and/or controlled in (and out) of the treatment zone.

Figure 5:
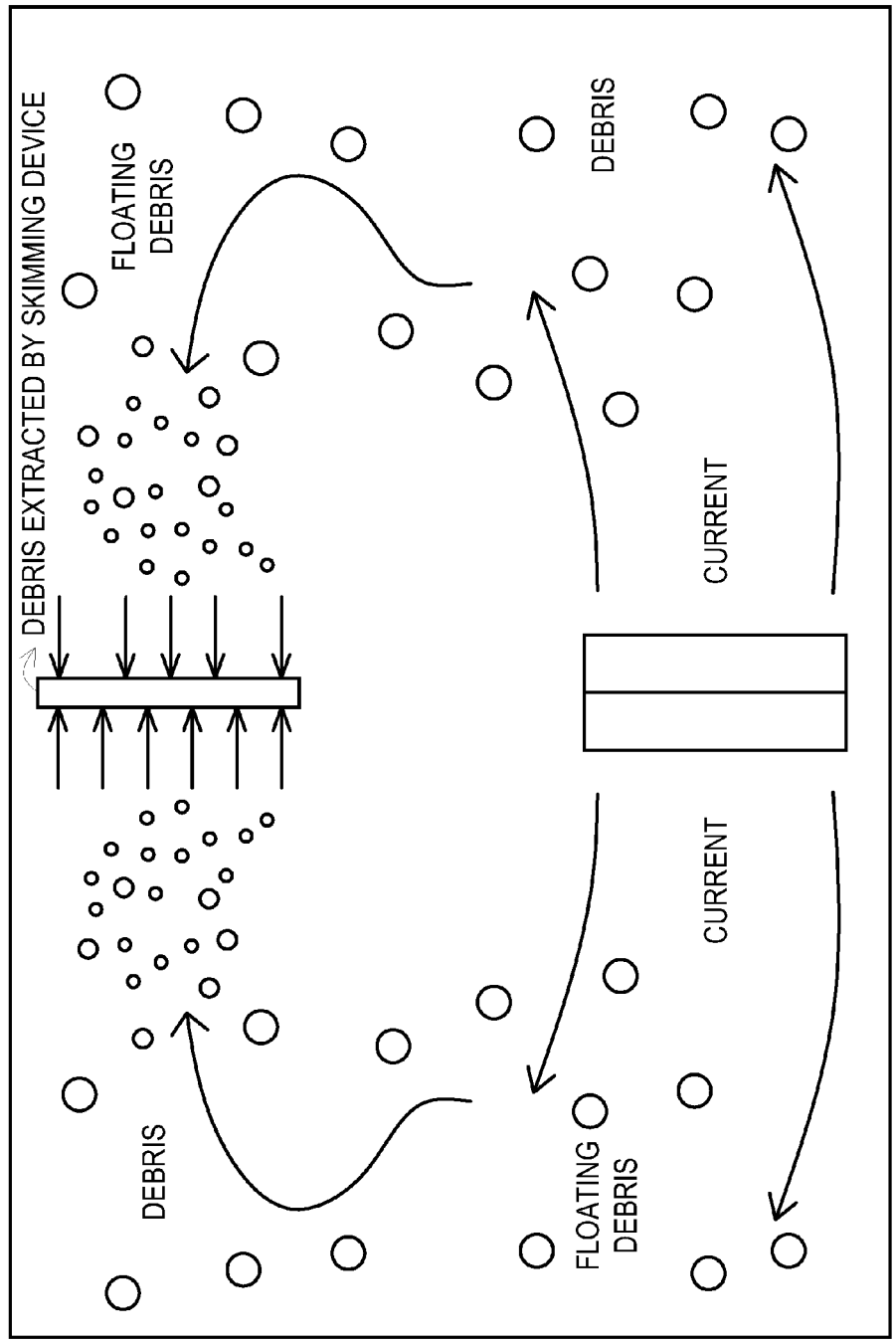
FIG. 5 depicts the collection of debris.
Figure 6:
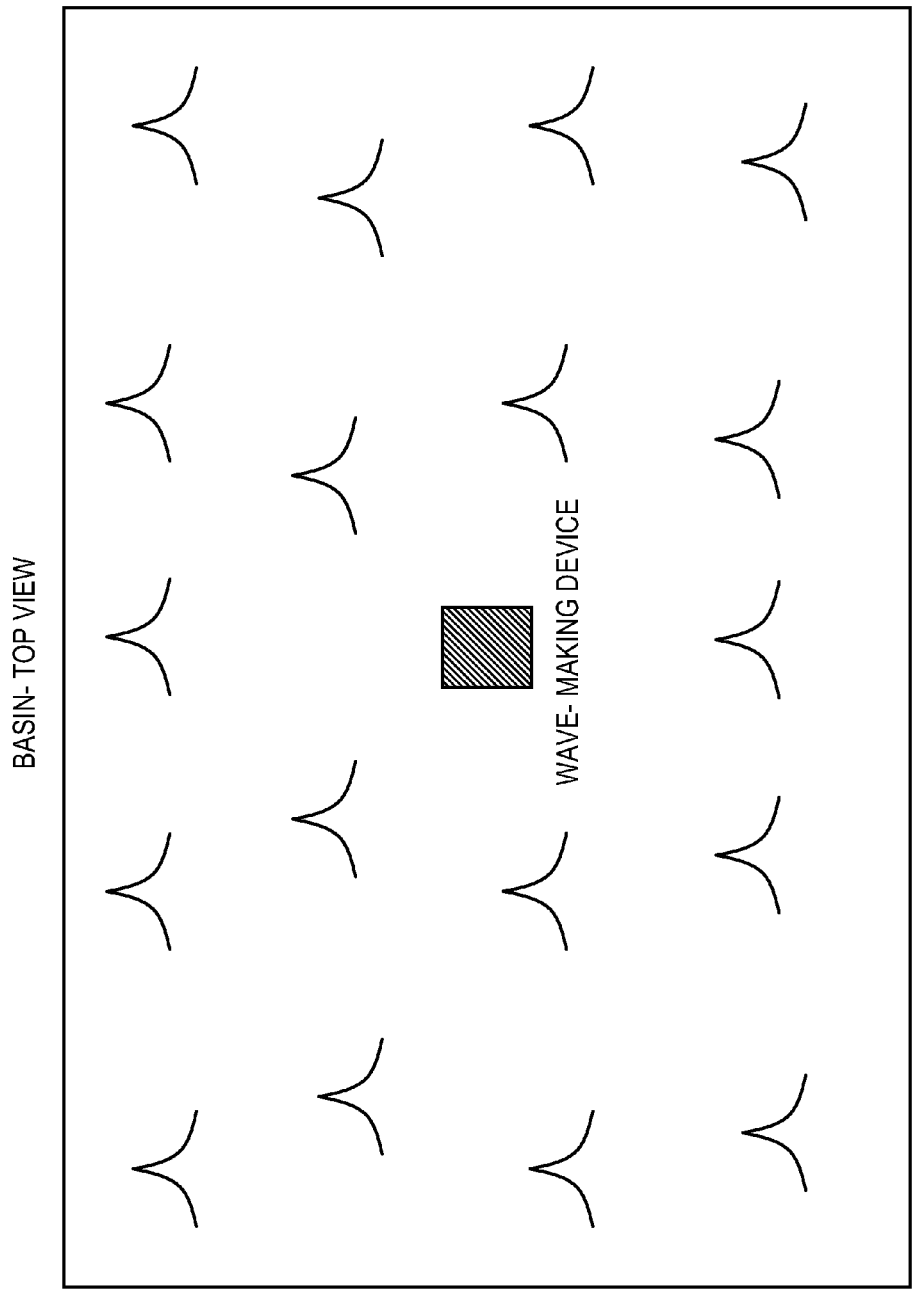
FIG. 6 depicts a top view of the creation of waves.
Figure 7:
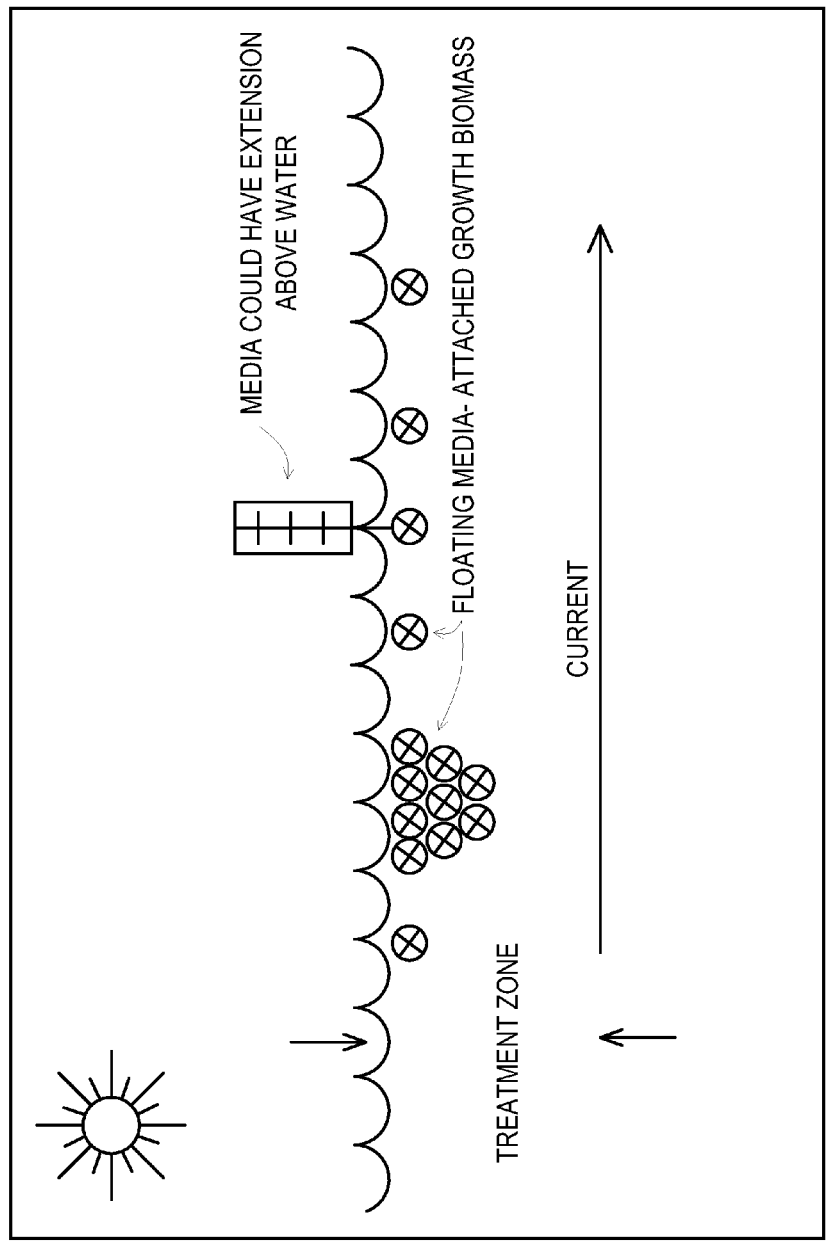
FIG. 7 depicts the addition of media into an exemplary treatment zone.
Figure 8A:
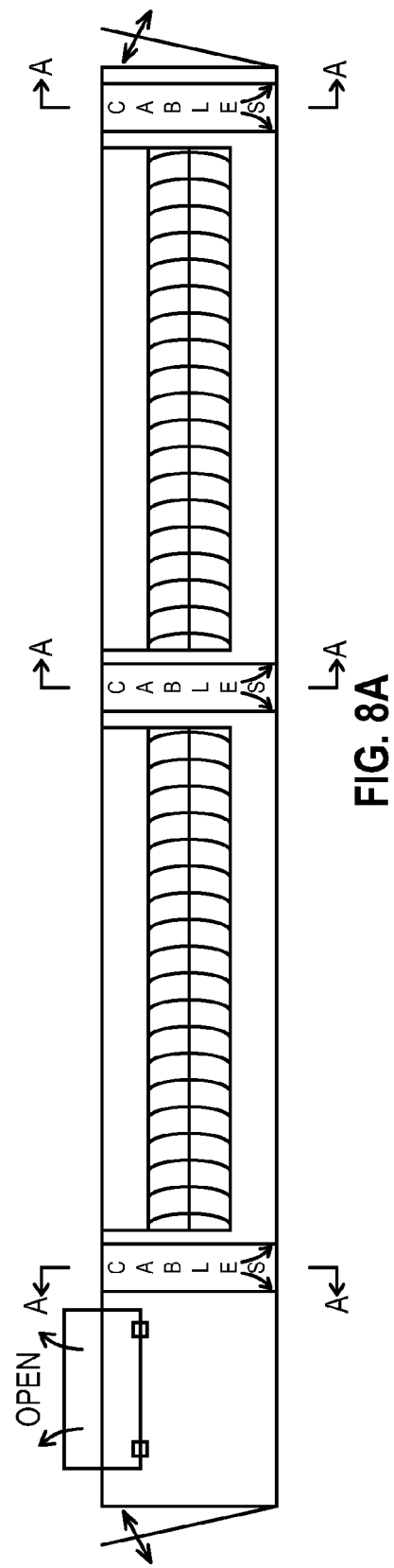
FIG. 8 depicts an exemplary current creating machine.
Figure 8B:
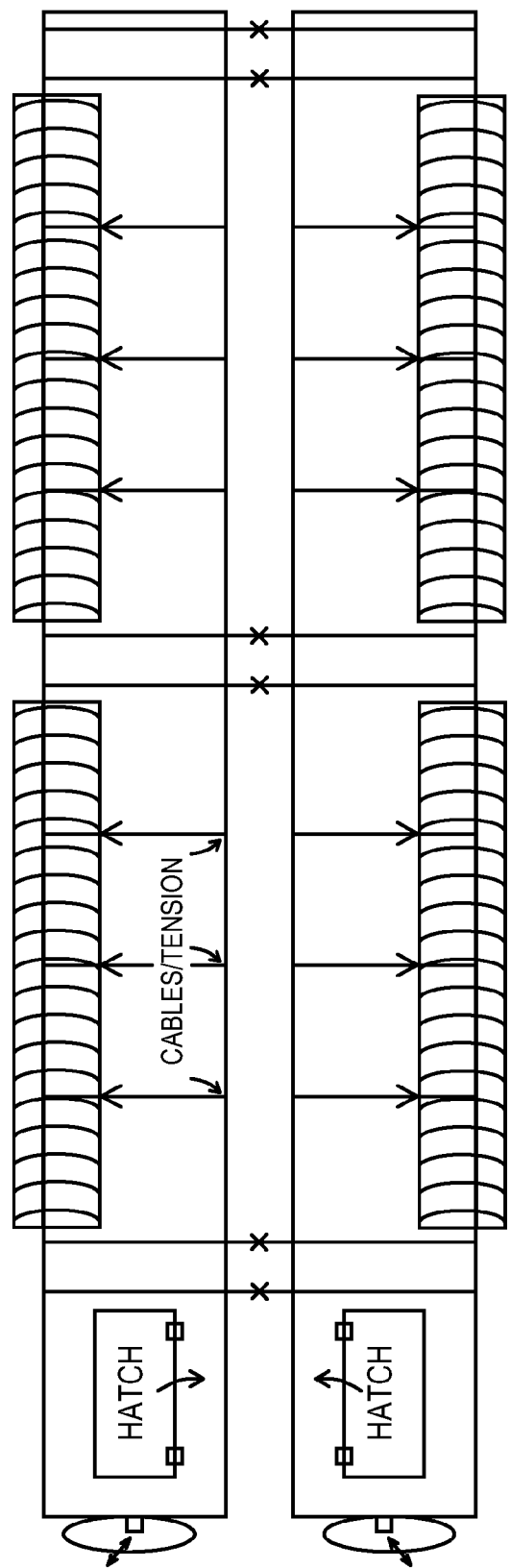
Figure 11A:
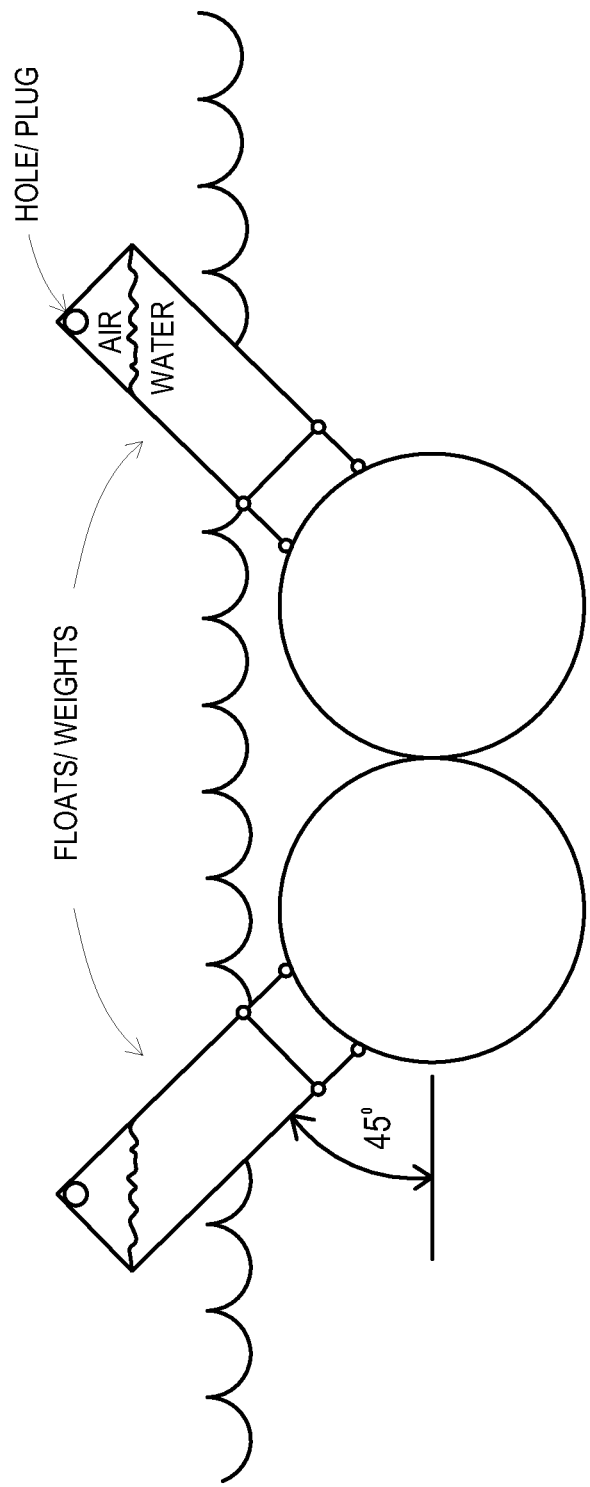
FIG. 11 depicts a way to add ballast to an exemplary current creating machine.
Figure 11B:
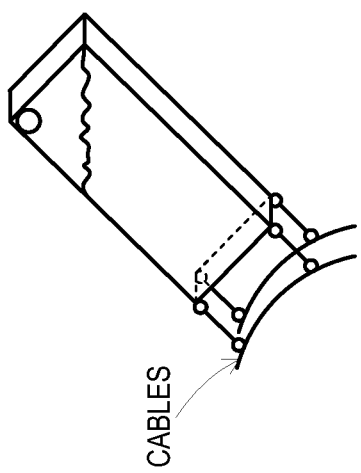
Figure 12A:
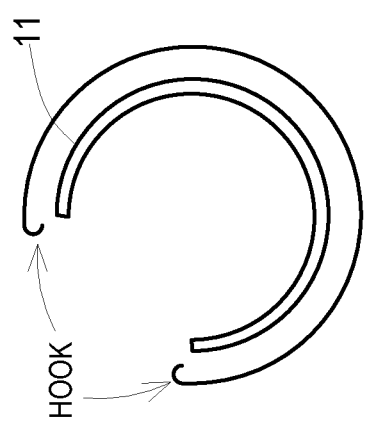
FIG. 12 depicts design characteristics of an exemplary current creating machine.
Figure 12B:
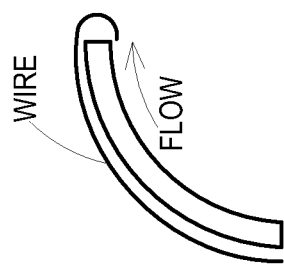
Figure 13A:
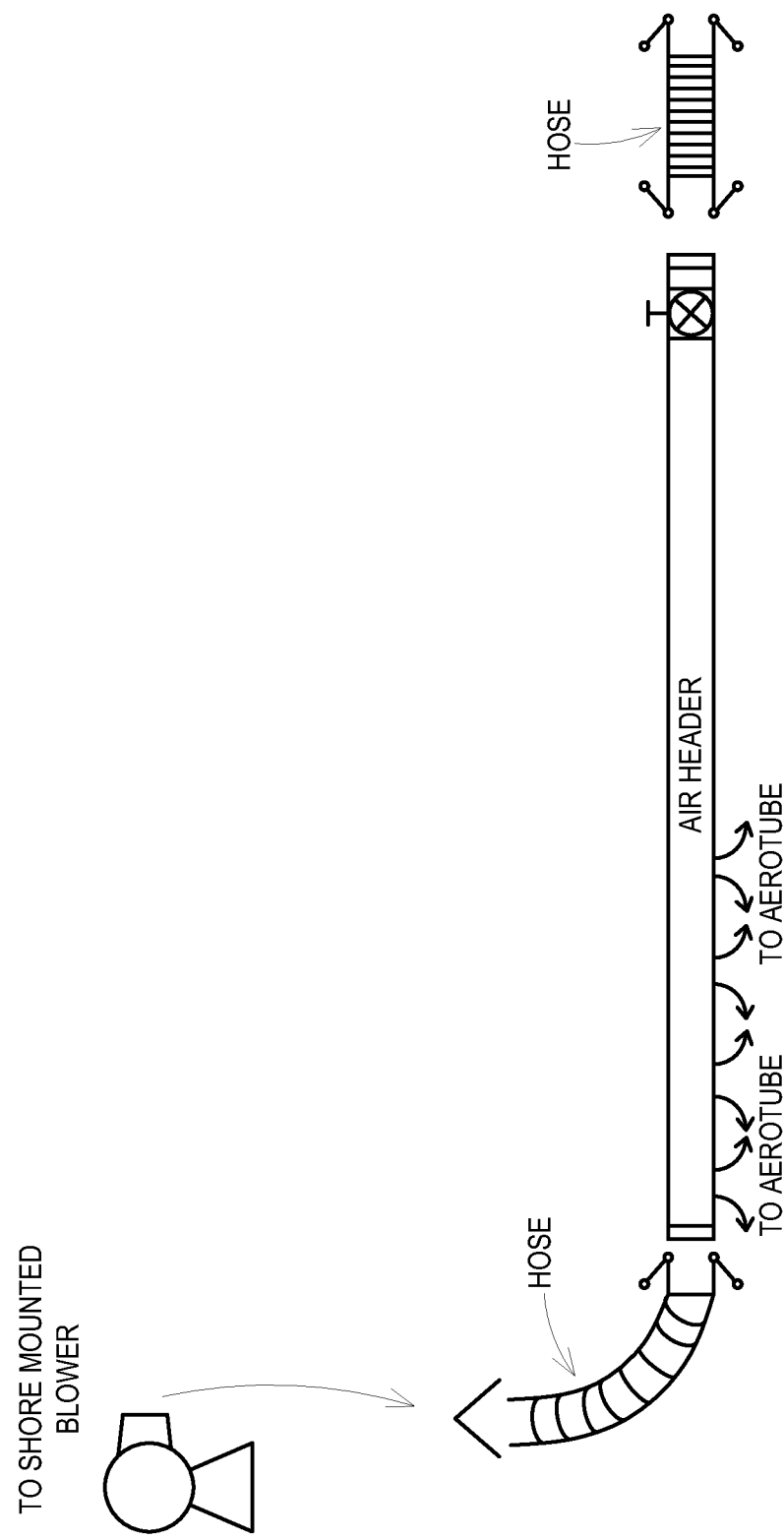
FIG. 13 depicts design characteristics of an exemplary current creating machine.
Figure 14:
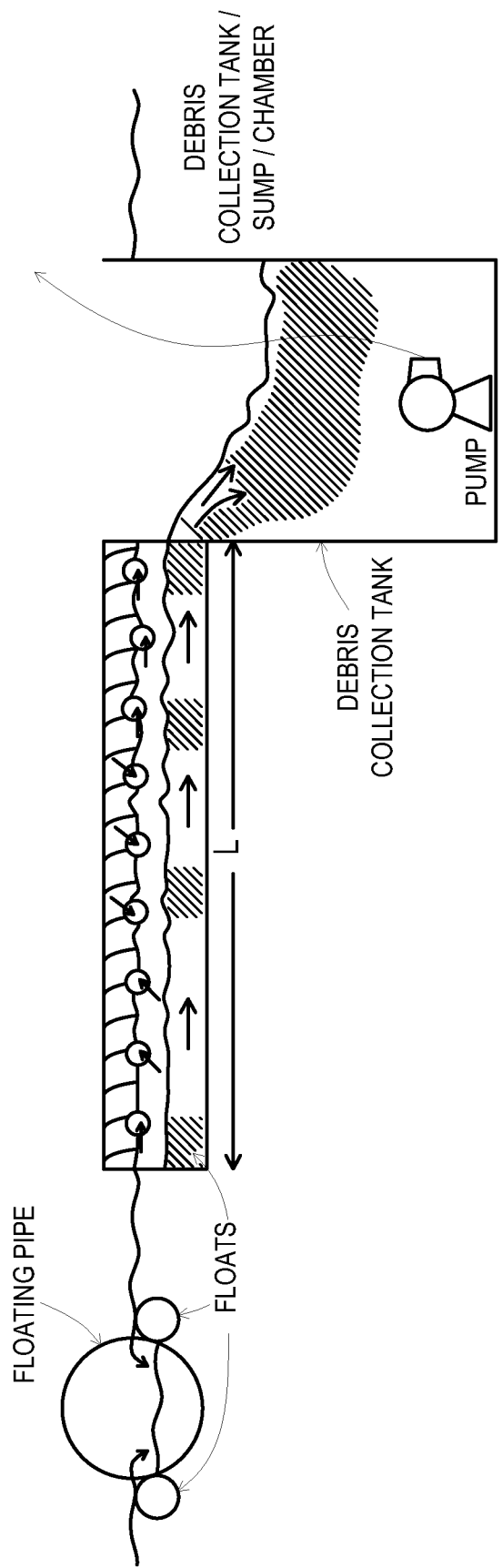
FIG. 14 depicts an exemplary skimmer assembly.
Figure 15:
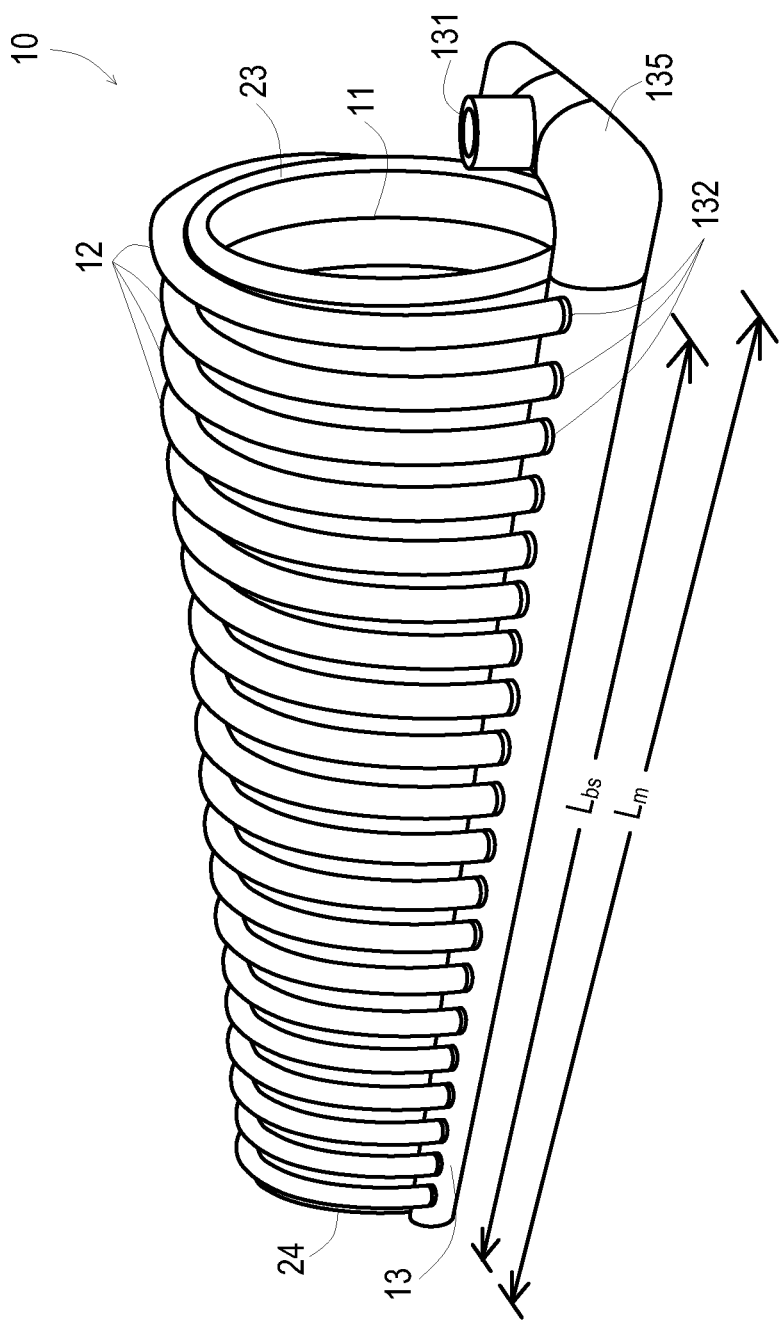
FIG. 15 depicts a perspective view of an exemplary gas-distributing apparatus suitable for use in the liquid treatment systems of the present invention.
Figure 16:
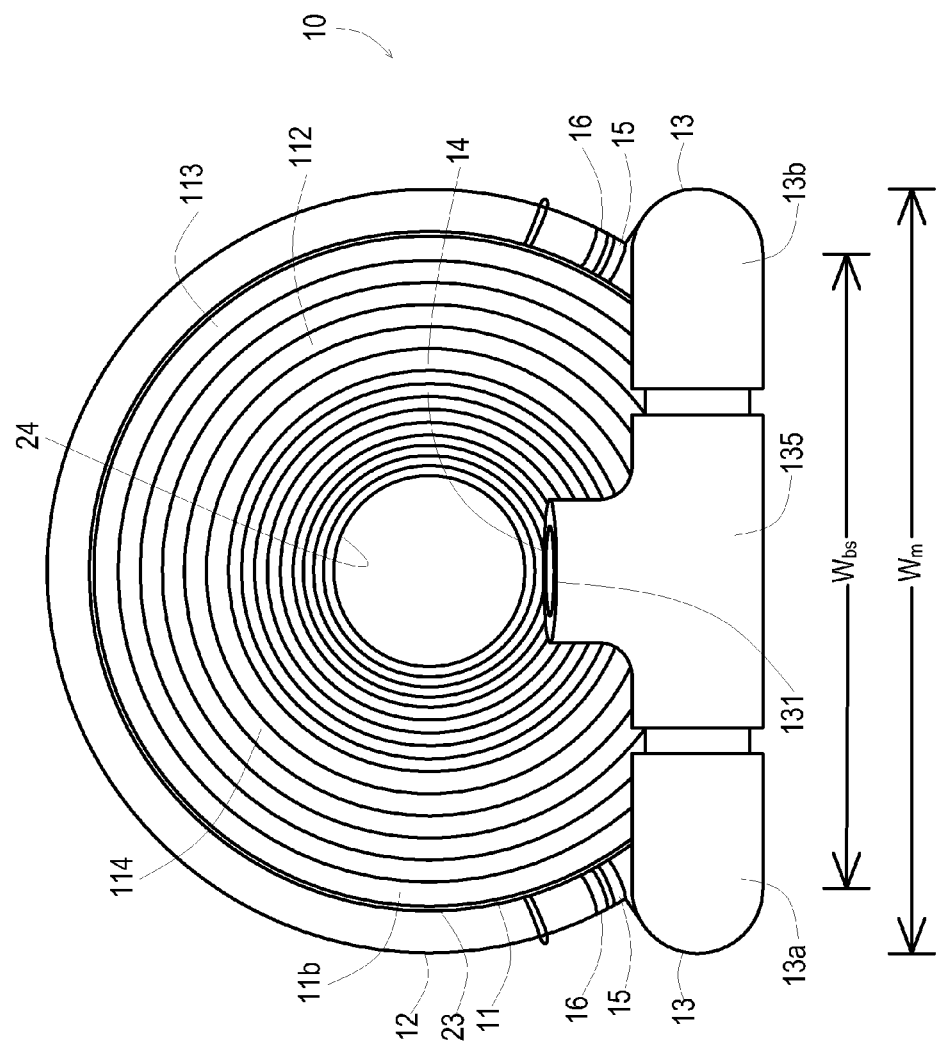
FIG. 16 depicts an end view of the exemplary gas-distributing apparatus shown in FIG. 15.
Figure 17:
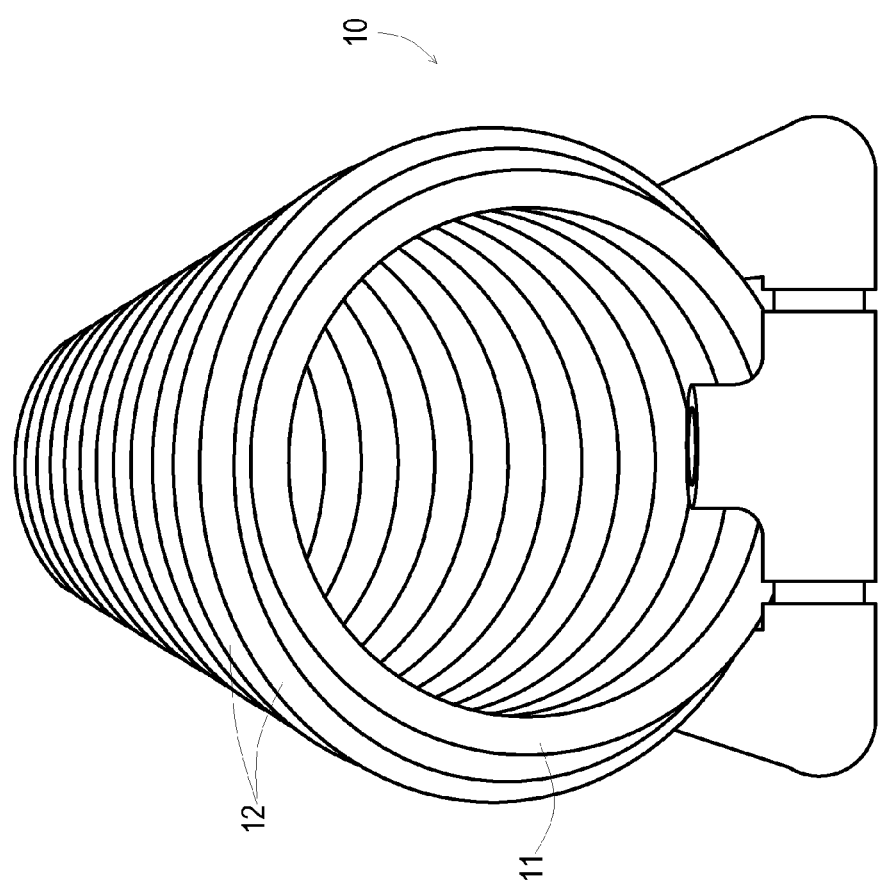
FIG. 17 depicts an end/top view of the exemplary gas-distributing apparatus shown in FIG. 15.
Figure 18:
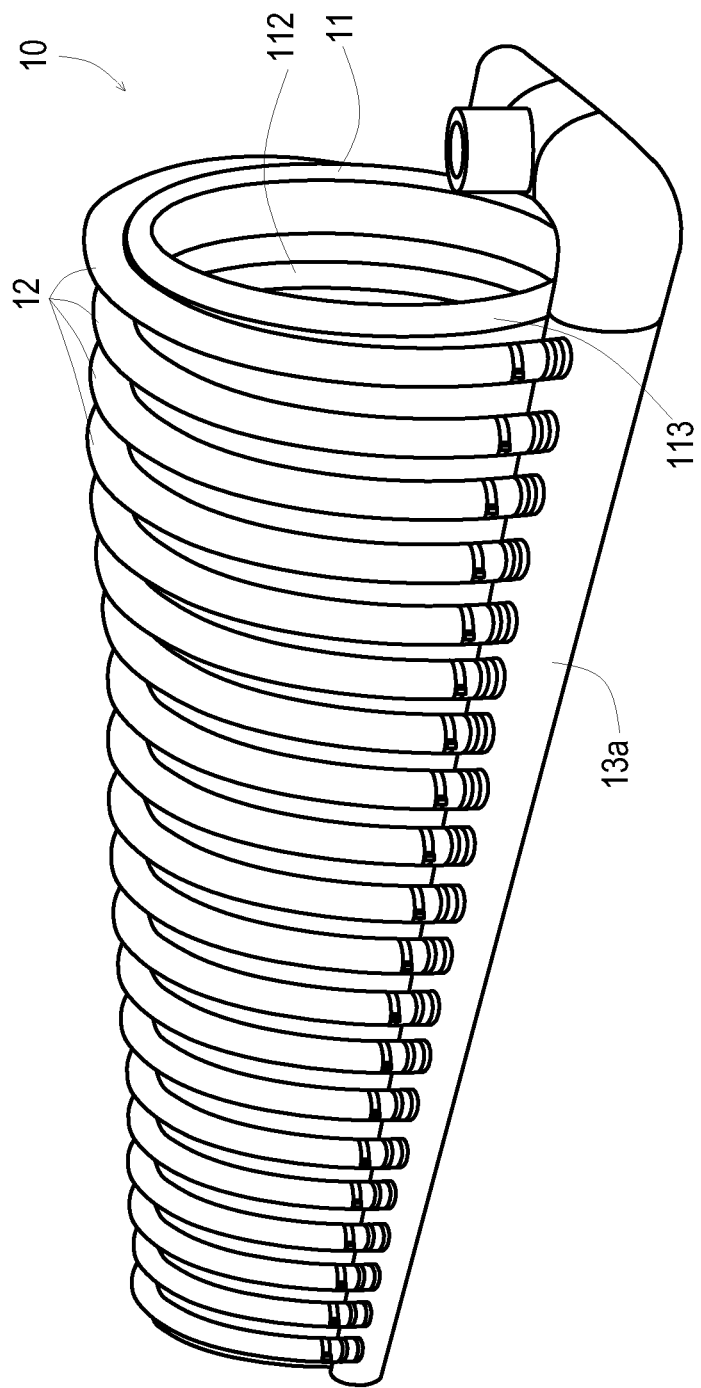
FIG. 18 depicts a view of a left side of the exemplary gas-distributing apparatus shown in FIG. 15 as viewed along a length of the exemplary gas-distributing apparatus.
Figure 19:
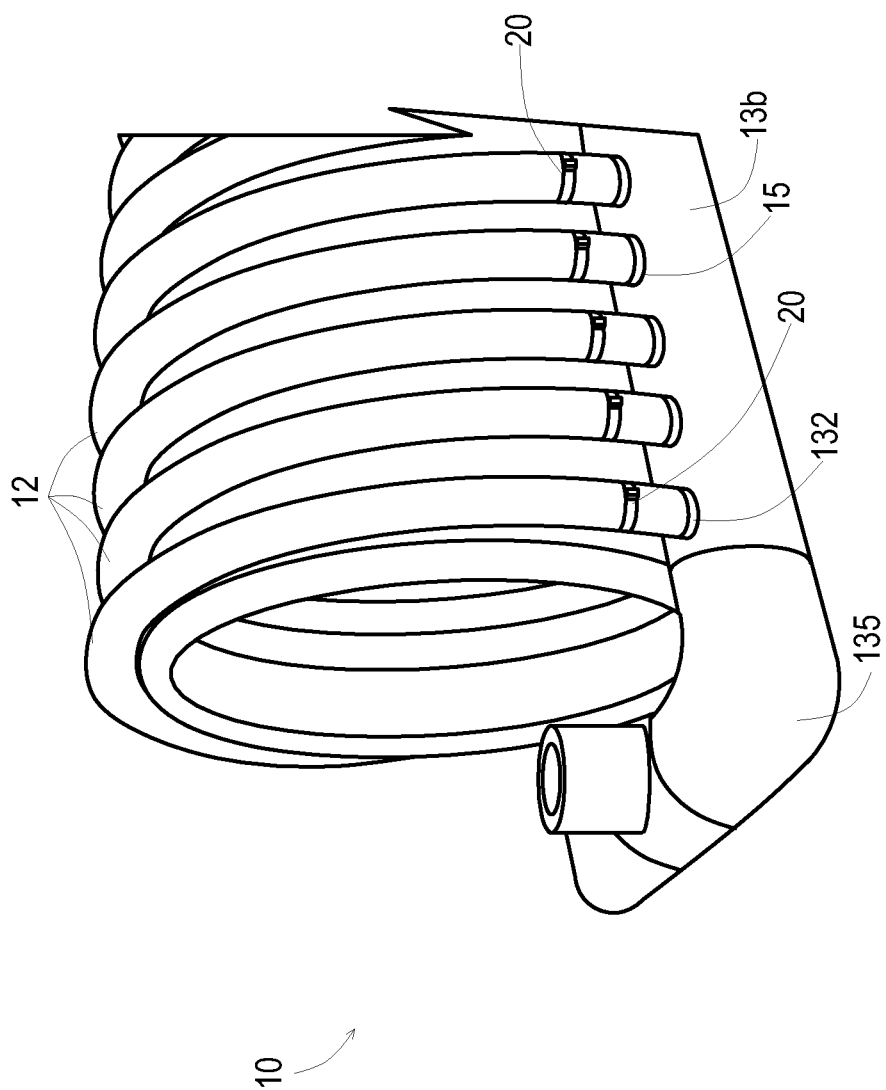
FIG. 19 depicts a view of a right side of the exemplary gas-distributing apparatus shown in FIG. 15 as viewed along a length of the exemplary gas-distributing apparatus.
Figure 20:
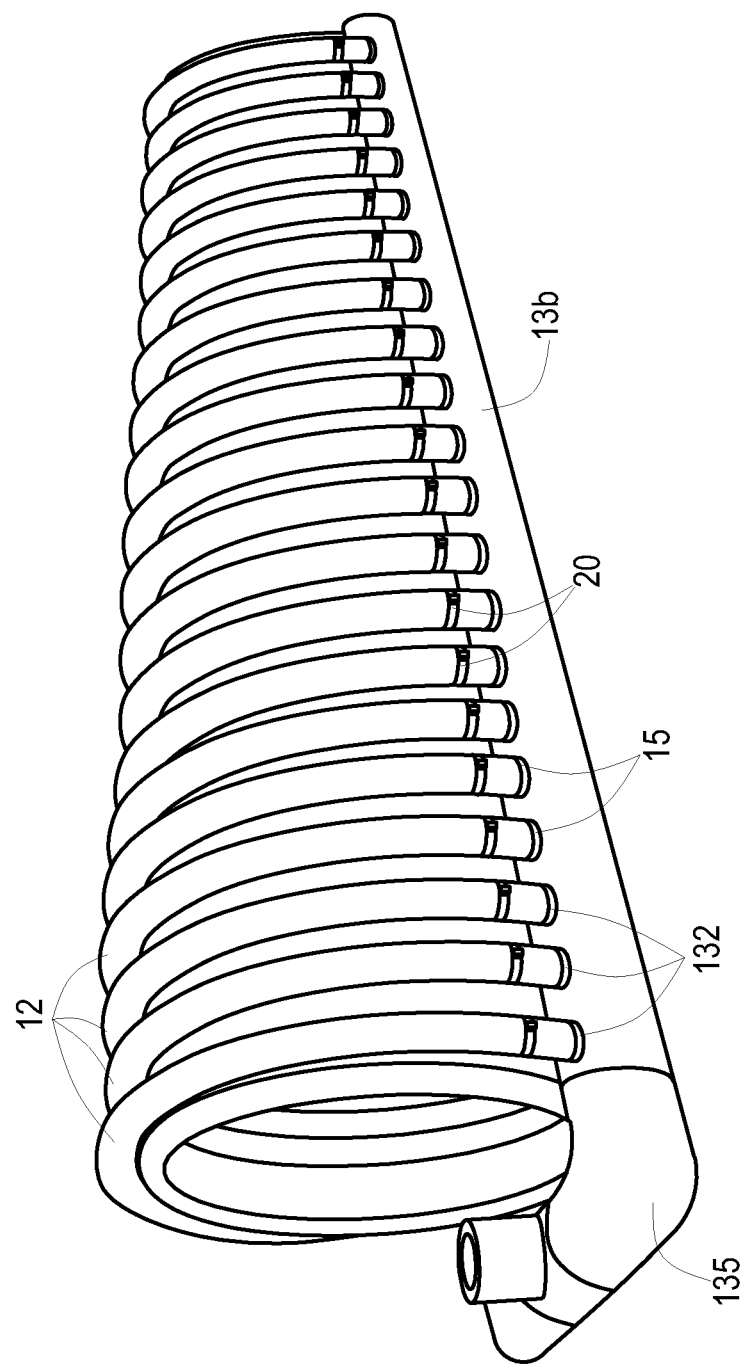
FIG. 20 depicts another view of a right side of the exemplary gas-distributing apparatus shown in FIG. 15 as viewed along a length of the exemplary gas-distributing apparatus.

The disclosed liquid treatment systems, components suitable for use in liquid treatment systems, and methods of treating liquids of the present invention may comprise and/or utilize one or more of the herein-described devices/apparatus that enable treatment of a body of liquid. In some embodiments of the present invention, the disclosed liquid treatment systems, and methods of treating liquids comprise a current-producing device as shown in FIGS. 4-5 and 8-13. In some embodiments of the present invention, the disclosed liquid treatment systems, and methods of treating liquids comprise a wave-producing device as shown in FIG. 6. In some embodiments of the present invention, the disclosed liquid treatment systems, and methods of treating liquids comprise a debris-collection device as shown in FIGS. 5 and 14. In some embodiments of the present invention, the disclosed liquid treatment systems, and methods of treating liquids comprise one or more floating media devices as shown in FIG. 7.

A description of individual devices/apparatus that enable treatment of a body of liquid, and methods of making and using the same, is provided below.

Current-Producing Devices

To create the treatment zone, water near the surface is put into motion and currents are produced. These induced, directional flows of water are much like currents existing in the ocean—like a rip current or the Gulf Stream. The difference would be that the invention's currents are enacted primarily in just the upper, sunlit areas of a reservoir—not all the way to reservoir floor. It should be noted that by creating currents in the reservoir rather than "circulating" the water, we are putting it in large swirl-like patterns of motion as you would look down on it from above. Circulating the water would typically entail pulling water from a certain depth and pumping radially outward from a central location—oftentimes at numerous locations. These are two distinctly different methods of mixing water.

Current mixing has significant advantage over circulation mixing. When a reservoir stratifies in the warmer months of the year, the water takes on distinctly different densities at various depths. The deeper you go, the more dense the water, the more viscous the water. Water of a specific density migrates to neighboring water of equivalent density. If cooler, denser water is introduced into warmer, less dense water, for example, the cooler water will migrate back down towards its previous depth/density. Conversely, if warmer water is introduced into deep, denser water, it will rise toward the surface. This is a very important phenomenon because when you circulate water, you typically pull water from below (denser water) and send it out across warmer water. Taking a cross-section of the water, you have two currents fighting against each other. The lower one is moving toward the machine and the upper one is moving away from the machine. The density influence of the water will force these two currents to collide, hindering the reach of the circulation. Even if the water being circulated has the exact same density, it still forces water into conflicting currents one on top of the other, shearing one against the other. The invention's current mixing does not force layers of water to flow against each other and therefore has the capability to put water into motion with less energy. As the current flows through the epilimnion, the shear forces are exerted to the water next to and below the current against water that is not flowing against the current. These shear forces put the neighboring water into motion itself in the same direction of the current. The water below the current will have much less propensity to move because of its density and higher viscosity.

Once the treatment zone reaches equilibrium hydraulically, nutrients can be introduced into the treatment zone from below hydraulically on an as-desired basis. An example of this would be introducing nitrogen or ammonia (or air or oxygen) from lower depths up into the treatment zone to provide nutrients for microbial growth within the treatment zone. The invention basically allows for the dosing of nutrients to the treatment zone rather than uncontrolled exposure of nutrients to the treatment zone (sunlight). As per the previous paragraph, this lower water with the nutrients will have a greater density than the water in the treatment zone and will tend to want to drop out of the treatment zone back to cooler water. However, if the goal is to "feed" microbes within the treatment zone, this can be accomplished within the timeframe the cooler water can exist within the treatment zone.

Wave-Producing Devices

One embodiment of the invention is a method for optimizing reservoir water quality whereby a reservoir's surface is manipulated into wave form at select times, duration, and amplitude(s) in order to affect sunlight penetration, photosynthesis, heat transfer, mixing, agitation, movement, and other mechanisms occurring across and through the surface. Rather than allow water quality within a reservoir to be established on natural and/or environmental occurrences alone, the invention enhances or suppresses environmental occurrences impacting on a reservoir on an as desired basis so that water quality progresses towards a desired output.

Waves affect a number of transport mechanisms occurring across a reservoir's surface. They have a dramatic effect on heat transfer as they affect sunlight reflection and refraction, surface area, evaporation, and cooling and heating. Waves play a key role in mixing reservoirs. Wind creates waves, and as the waves get pushed across the surface they displace water and mix the reservoir (i.e., typically, the larger the waves, the greater the potential for mixing). Waves can break up surface debris or less dense material (ex. oils, floating weeds, etc.) that may be floating on the surface. Waves can create pathways for gases to be released from the reservoir, or sunlight to be let in, for example. Although waves have long been a key contributor to reservoir water quality, the invention is the first time waves of a certain amplitude and characteristic have been mechanically created at select times and water quality conditions, to enact a change in reservoir water quality and/or characteristics. Depending on the goal of the wave creation, any number of outputs can be realized.

Heat Transfer Manipulation

Sunlight has a major impact on reservoirs. It warms water (radiant heat), creates density stratification, disinfects microbes (ultraviolet light), fuels photosynthesis (visible light), and much more. Microbes and plants utilize energy from sunlight and can sometimes compete with each other for it.

When sunlight hits the surface of a reservoir, some of it is reflected away from entering the water body and some of it penetrates the surface. This sunlight penetration occurs in accordance to Snell's Law. Snell's law states that the ratio of the sines of the angles of incidence and refraction is equivalent to the ratio of phase velocities in the two media, or equivalent to the reciprocal of the ratio of the indices of refraction:

$$\frac{\sin\theta_1}{\sin\theta_2} = \frac{v_1}{v_2} = \frac{n_2}{n_1}$$

with each θ as the angle measured from the normal of the boundary, as the velocity of light in the respective medium (SI units are meters per second, or m/s) and n is the refractive index (which is unitless) of the respective medium.

Figure 25:
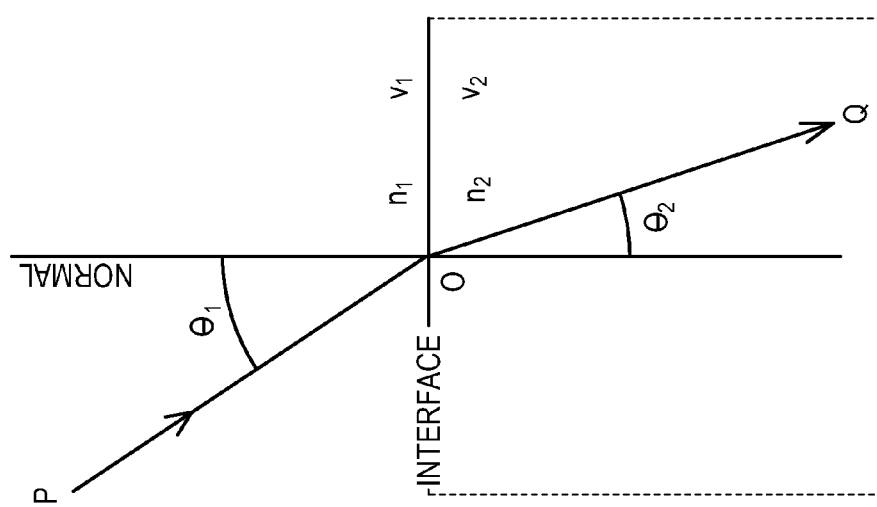
FIG. 25 illustrates the refraction of light at the interface between two media of different refractive indices.

FIG. 25 illustrates the refraction of light at the interface between two media of different refractive indices, with $n_2 > n_1$. Since the velocity is lower in the second medium ($v_2 < v_1$), the angle of refraction θ2 is less than the angle of incidence θ1; that is, the ray in the higher-index medium is closer to the normal.

Figure 26:
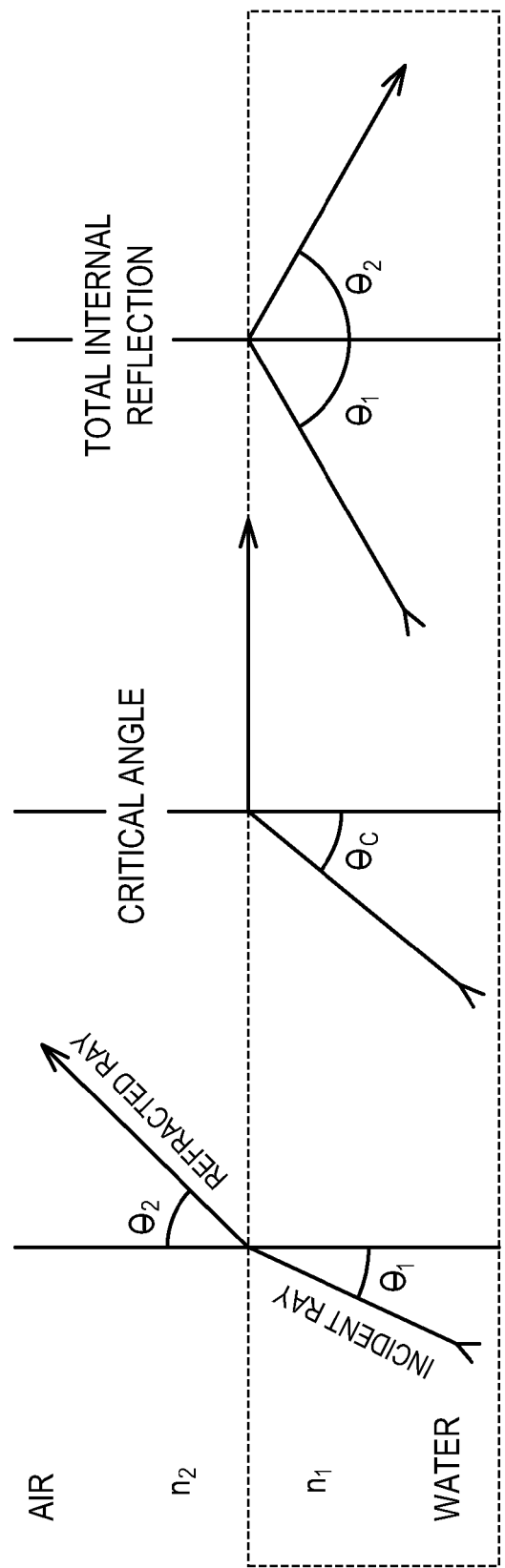
FIG. 26 illustrates the angle of incidence that produces an angle of refraction of 90° is called the critical angle.
Figure 28A:
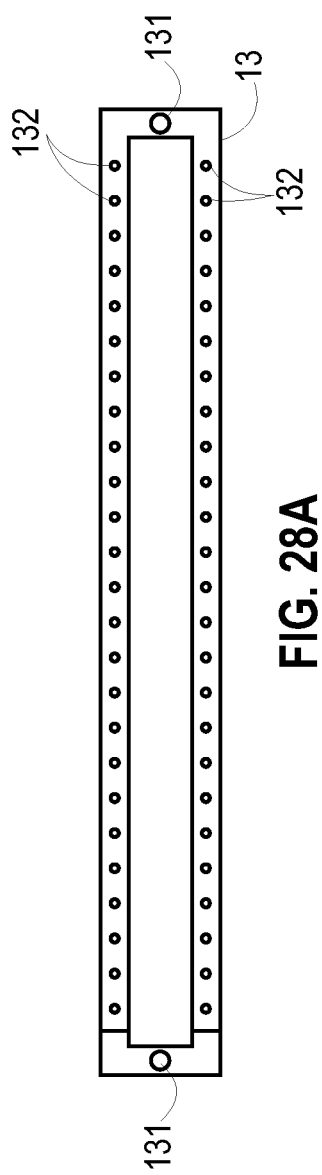
Figure 28B:
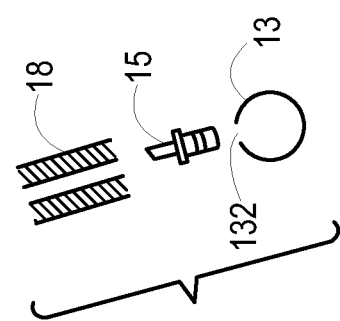
Figure 29A:
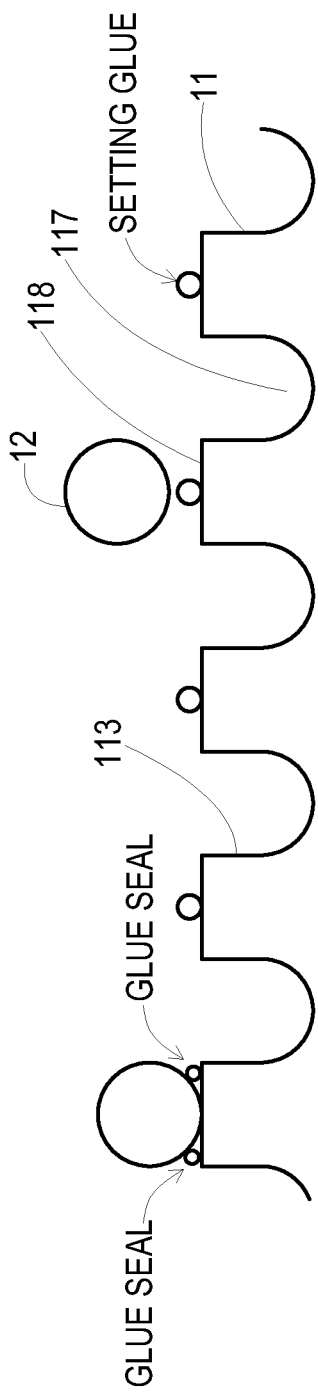
Figure 29B:
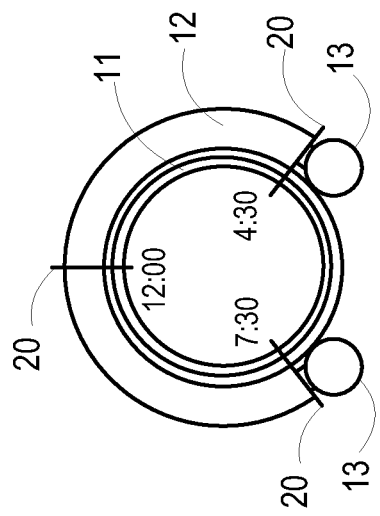
Figure 32A:
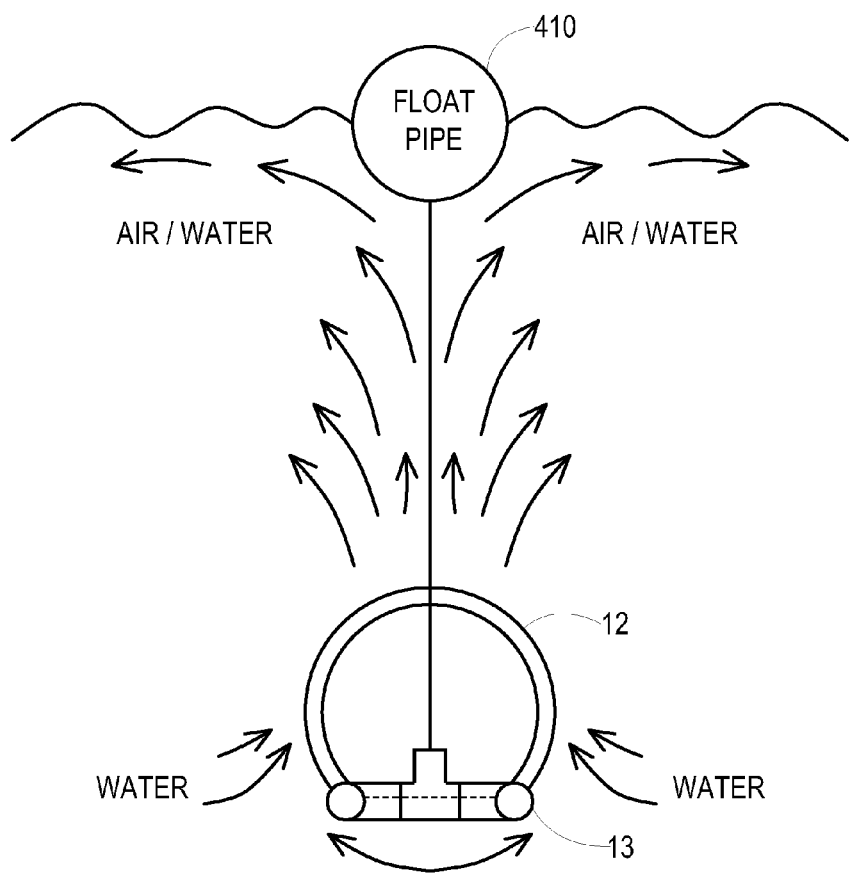
Figure 32B:
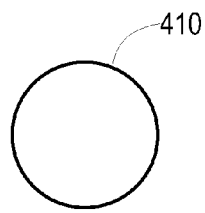
Figure 32C:
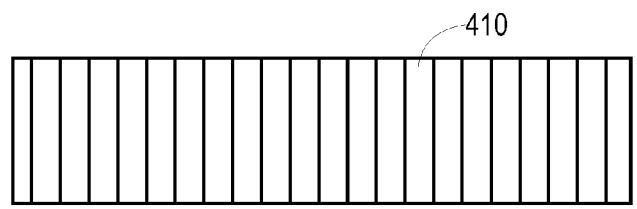

FIG. 26 illustrates the angle of incidence that produces an angle of refraction of 90° is called the critical angle.

As waves disrupt the surface of a reservoir, a changing normal vector is created, which therefore creates a changing angle of incidence (and refraction) relative to the angle of the sun's position in the sky. As the angle of incidence eclipses the critical angle, sunlight that could have gone into the water body is reflected away from the water body. Further reflection of light can be realized as light reflects off the surface of one wave to another wave where it may be reflected away.

Limiting the amount of sunlight penetration in a reservoir can have a profound impact on water quality. Less sunlight means less heating, cooler water, greater dissolved oxygen, less stratification, and greater mixing. Less sunlight means less photosynthesis and less productive micro-biology. If we can reduce the production rate of algae, and particularly certain forms of algae (ex. blue green algae), the taste and odor of water can change and require less chemicals to treat in a water treatment plant. Cooling the water reduces evaporation, which preserves water availability.

Evaporative Cooling Manipulation

As water evaporates at the surface into vapor, it cools the surface of the water. This cooled layer of water at the surface drops in the water column because it is denser than the water directly beneath it. As it drops, warmer water is exposed to the surface and the cycle repeats. The vertical movement or "dancing" of water molecules mixes a reservoir. Depending on the air and water temperature, and other factors, a reservoir can be cooled.

There are several factors that affect the evaporation rate of water at the surface, and therefore the cooling rate. One significant factor is the amount of surface area of the water. A substance that has a larger surface area will evaporate faster because more surface molecules are available to escape to the air. As a reservoir gets cooler, the rate of evaporation will decrease. The temperature of the air relative to the water is another significant factor. Evaporation occurs according to the following equation:

$$\ln\left(\frac{P_2}{P_1}\right) = -\frac{\Delta H_{vap}}{R}\left(\frac{1}{T_2} - \frac{1}{T_1}\right)$$

where $P_1$, $P_2$ are the vapor pressures at temperatures $T_1$, $T_2$ respectively, $\Delta H_{vap}$ is the enthalpy of vaporization, and R is the universal gas constant.

Waves increase the surface area of a reservoir. If waves are created on the surface at select environmental conditions, and particularly when the temperature of the air drops below that of the water, evaporation can be accentuated. Therefore waves can be utilized to enhance evaporative cooling.

Wind Mixing Manipulation

Wind creates waves, and pushes waves downwind toward an end of a reservoir. After the waves hit the shore, the water within the waves is pushed down in the water column to make room for more waves coming across the surface. This wave movement mixes a reservoir.

The larger the wave, the more it "catches" the wind and greater force is exerted to push the wave across the surface of the reservoir (just like a sail boat). In essence the wind pumps more water to the downwind shore, which causes greater mixing in the reservoir.

Mixing a reservoir has dramatic effects on water quality characteristics. Like a moving stream compared to stagnant water, it is well documented that mixing water has significant benefits.

It should be noted that waves travel very long distances across a surface. With minimal energy input and from one or a few locations, waves can be generated that travel incredibly long distances. This can be observed in tsunamis, for example. Waves can also be generated to significant heights by managing and manipulating frequencies, wavelengths, and/or harmonics. (Think of the Tacoma Narrows Bridge.) The invention's wave generating aspect takes advantage of the unique efficiencies in waves.

The invention attempts to regulate a reservoir's water quality on a proactive basis rather than on a reactive basis to environmental conditions. It also endeavors to do this with minimal energy input or with naturally available energy. In some embodiments, solar energy may be used. Ideally the invention is a completely "green" solution where no grid power is required.

To generate waves, an infinite number of devices can be used. These devices are preferentially designed to have maximum energy efficiency and minimal maintenance and operator attention. In some cases they may be floating devices and in others they are fixed, like shore-mounted devices or devices sitting on the reservoir floor. Several devices have been envisioned and developed, but the invention is not limited to one apparatus. In many cases the apparatus' used to accomplish the invention may be patentable themselves.

It should be noted that there are specific applications where the invention is particularly useful. One is in the treatment of wastewater in a lagoon. Another is the transport, containment, and potential use or removal of floating weeds such as Duckweed (Limnoideae) in a lagoon/reservoir—or to suppress weed formation and rooting. Another is the suppression of algae growth in a clarification basin or tank. Another is the control of algae, bacteria, or specific kinds of microbes in reservoirs. Another is to enhance and control aquaculture and fisheries. Another is to evaporate water from a reservoir or tank, or leachate pond. Another is to enhance power generation by producing cooler reservoir process cooling water. Another is to suppress mosquito growth. Another is to erode a shoreline. Another is to hinder ice formation—or to break up ice. There are countless specific applications for this invention.

Infinite combinations of operating a wave generating device may be used. Then the specific applications for the method are embodiments of the invention.

By enacting treatment on a reservoir and optimizing water quality, the invention can achieve both direct and indirect benefits. A drinking water reservoir's water quality can be enhanced with the invention, which can reduce taste and odor causing compounds, which would result in a reduced chemical demand at its water treatment facility. Lagoon wastewater treatment systems could require less horsepower to achieve the same or better effluent quality. Power plants could generate megawatts of additional power as a result of cooler cooling water. Fish production could increase in aquaculture. All these benefits and more can justify the implementation of the technology.

Another aspect to the invention is the physical manipulation of the water-air interface. The hydraulic currents produced can be established in a way that directs floating material/debris to specific locations on the surface. By having a clear, controlled surface, it provides a platform for regulating sunlight down into the water body.

Infinite combinations of operation between hydraulic movement of the water and generation of waves may be used. The establishment of a sunlit treatment zone where nutrients are selectively introduced is, in itself, one embodiment of the invention method. Separately, the selective generation of waves on the surface to manipulate energy transport across the medium is, in itself, another embodiment of the invention. Then the specific applications for the method are embodiments of the invention.

By enacting treatment on a reservoir and optimizing water quality, the invention can achieve both direct and indirect benefits. A drinking water reservoir's water quality can be enhanced with the invention, which can reduce taste and odor causing compounds, which would result in a reduced chemical demand at its water treatment facility. Lagoon wastewater treatment systems could require less horsepower to achieve the same or better effluent quality. Power plants could generate megawatts of additional power as a result of cooler cooling water. All these benefits and more can justify the implementation of the technology.

Liquid treatment systems of the present invention may further comprise one or more of the following additional system components, each of which is discussed separately below: (1) a surface debris removal device/apparatus; (2) surface media treatment device/apparatus; (3) rip turbine device/apparatus; and (4) a gas-distributing device/apparatus.

Surface Debris Removal Devices

Liquid treatment systems of the present invention may further comprise one or more surface debris removal devices for use in methods for containing and or processing floating debris in bodies of water. Like airport travelers being processed through security, the systems and methods of the present invention put floating debris on a water surface into a specific current/path that leads it to a processing point(s). The floating debris is then either treated in some fashion at the processing point, is extracted from the water, or is contained in some way so it no longer has free movement to cover the water surface.

In some specific embodiments, the systems and methods of the present invention utilize currents, discussed above, to accomplish a specific task of separating floating debris from the surface. Some floating debris is valuable from a treatment perspective (e.g., Duckweed, etc.), so in some cases, it is desirable to corral or contain this debris and use it to remove nutrients. In other cases, it might be desirable to grow the debris in a contained way for beneficial reuse purposes.

Figure 4:
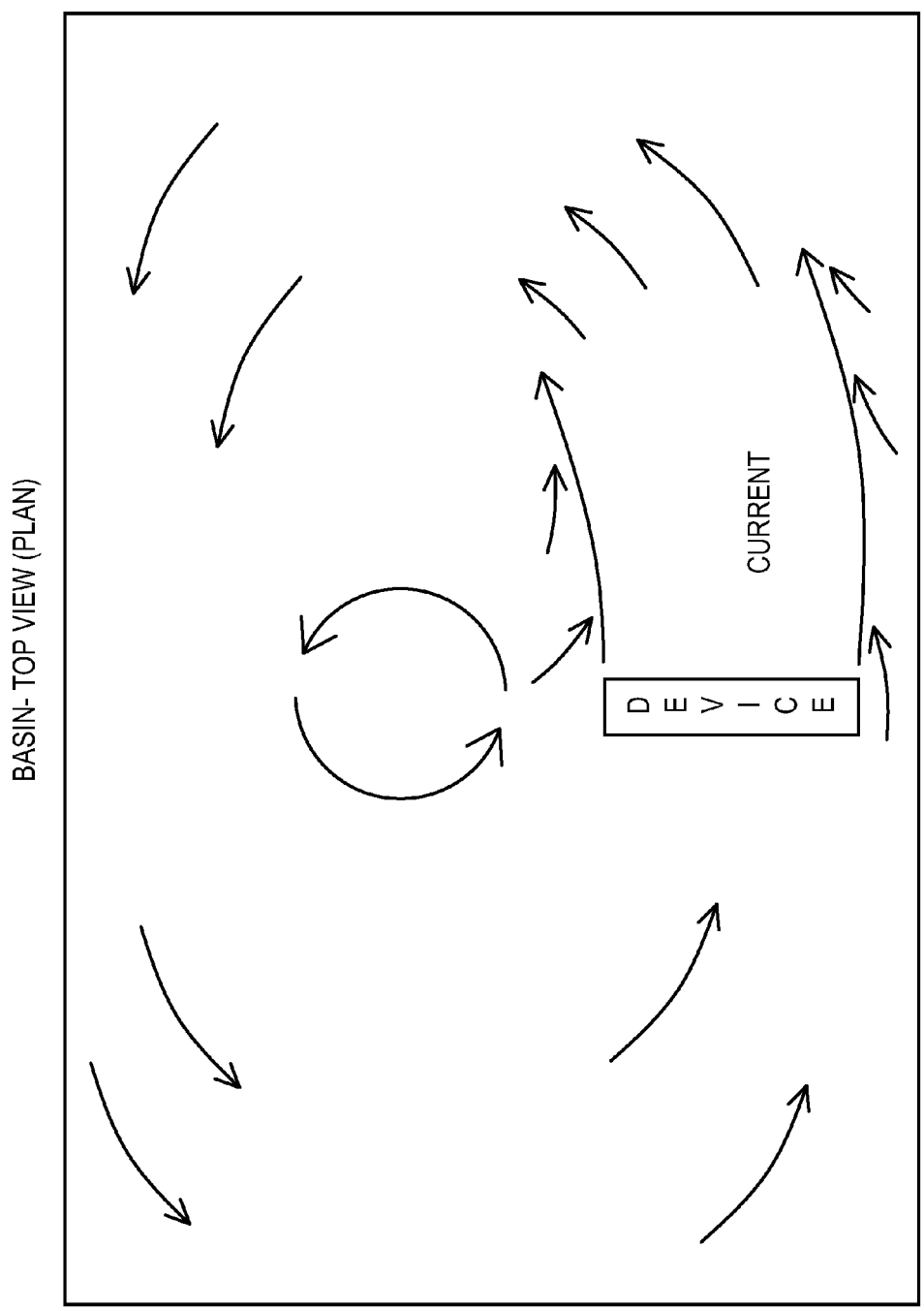
FIG. 4 depicts the establishment of currents at the surface of an exemplary reservoir.

In some specific embodiment, the systems and methods of the present invention provide one or more of the following features:

1) puts the surface of a water body into motion (see FIG. 4);

2) creates a surface current that moves floating debris toward specific locations within the water body;

3) the floating debris is then captured, contained, concentrated, or processed so it is no longer free to cover the surface of the body of water—or is sterilized/treated in some fashion so that the debris cannot sustain itself or reproduce once returning to the water body (see FIG. 5).

4) the floating debris is captured and utilized for treatment purposes;

5) one or more system components capture and direct nutrient-laden water into and through the captured floating debris to both sustain the floating debris and utilize it to remove nutrients;

6) one or more system components grow and/or produce a beneficial product out of the debris;

7) germicidal UV light or an oxidant such as ozone or peroxide is used to sterilize the floating debris as it is processed; and 8) systems and methods of the present invention may put the surface of a water body into a swirl motion consistent with the Coriolis effect that naturally occurs in the hemisphere it exists in; counter-clockwise in the northern hemisphere and clock-wise in the southern hemisphere.

Surface Media Treatment Devices

Liquid treatment systems of the present invention may further comprise one or more floating media in surface water treatment methods where floating media housing attached-growth biomass is used to enhance treatment of the water. Unlike other known moving bed bioreactors (MBBR's), the floating media of the present invention retains buoyancy that keeps it at or near the surface (see FIG. 7). Instead of providing the energy to move MBBR media throughout the water column to the nutrients, the floating media of the present invention endeavors to bring nutrients to the MBBR media residing at or near the surface. The floating media is then moved around the surface layers of the lagoon with mixers and/or aerators that influence treatment at or near the surface.

The floating media can have any number of designs, materials, appearances, and capabilities. It is desirable for the media to have maximum surface area under the water for biomass to grow. It is desirable for the media to be of a design that allows a lagoon to accommodate as much of the floating media as possible. It is desirable for the media to be of a design that facilitates the sloughing off of biomass as needed.

In one exemplary embodiment, the floating media of the present invention has a design and material that allows it to be heated by the sun. By increasing the temperature of the backbone media, attached-growth biological reactions below the surface could be enhanced and therefore enhance treatment of the lagoon. This could include the media having a solar panel/chip, some sort of battery to store energy/heat, and so forth. The stored energy could be used to heat the media during the night hours to enhance treatment due to the elevated temperatures.

In one exemplary embodiment, the floating media of the present invention has a design that has a component above the water that is influenced by wind. If an individual piece of media can be tipped over by the wind above the water, the stem extending below the water used for treatment will swing through the water, facilitating treatment and sloughing of old biomass.

In one exemplary embodiment, the floating media of the present invention contains electronic components and capability to transmit information about the media and or the surrounding water. The information about the media could be stored and "read" when it passes certain points in the lagoon, or communicate in any way possible.

In one exemplary embodiment, the floating media of the present invention could also be used to inhibit ice formation on the surface of a lagoon.

Floating Turbines

In some embodiments, in order to accomplish any of the aforementioned surface water treatment methods, liquid treatment systems of the present invention utilize one or more devices that put water near the surface into specific motion. Water in a reservoir generally stratifies based on temperature and density, and water near the surface tends to be the warmest, least dense water in the water column. If one wants to maximize the energy efficiency and capability of an apparatus to put water of a specific density into motion (i.e., surface water), it is most beneficial to direct and isolate as much energy as possible towards moving just the water that has the target density. For example, if cold, dense water is sent out across the surface, it will quickly fall underneath the warm surface layers and eventually stabilize at a water depth of equivalent higher density. Conversely, if warmer water of equivalent density to that at or near the surface is sent out across the surface, it will keep pushing horizontally until it runs out of momentum/forward energy (due to water viscosity/friction). It is important to note that by using the least dense water in a reservoir to mix the least dense water in a reservoir, minimal energy used to put it into horizontal motion is lost in the vertical direction (i.e., y-axis). In essence, density differences in water cause a consequential loss in horizontal mixing efficiency. Therefore, liquid treatment systems of the present invention preferentially move and mix just the warmest water in a reservoir.

There are many different kinds and forms of mixing water in a reservoir. Most common (i.e., known mixers) are mixers that draw water from below the surface, sometimes well below the surface, and send it out across the surface. One such technology is a mechanical surface aerator/mixer, which draws water directly beneath the mixer and sends it out into the air above the water in a circular pattern. The water is oxygenated when it becomes exposed to the air in the form of water droplets and as it drops onto the surface of the water it enacts some mixing. There are too many different types of mixers to discuss here, but principally, most all of them have a goal to enact movement in the water from the surface to a certain depth. It should be noted that oftentimes it is desired to not mix the water too deep as it will stir up sediment on the floor of the reservoir causing a variety of problems.

In some reservoirs and lagoon wastewater treatment systems, weeds, rags, and debris can wrap around and get caught in mixers. This is a significant problem in some places as it can be notably maintenance intensive to have to clean this debris off the mixer. When a mixer is fouled with debris, it is either running at reduced efficiency or may be shut down altogether—which obviously is counter to why they are installed in the first place. It is therefore desirable for a mixer to be of a design that minimizes the risk of getting fouled with debris, and maintenance.

The liquid treatment systems of the present invention may comprise an apparatus that uses air in a unique floating turbine to accelerate liquid out across the upper surface layers of a reservoir. Typically this liquid is water and in one embodiment of the invention, the turbine is a plastic, corrugated pipe. Air is introduced into select lower quadrants of the inside of the turbine, sometimes through special diffusers. As the air rises in the water, it causes water to lift and accelerate against the inner face of one side of the turbine. The air/water mixture is directed forward out of openings on the opposite side of the turbine. In essence, the liquid is put into a spinning motion within the turbine where it is eventually allowed to exit out through a window/opening that places the accelerated water at a specific depth in the water column, typically at or near the surface. FIGS. 8-13 illustrate an exemplary embodiment of the present invention.

The floating turbine can have corrugated ridges that provide unique benefits to its operation and efficiency. The ridges can provide a compartment for air diffusers to be nestled and therefore protected from rags, hair, and other fouling debris. The ridges also form compartments for air bubbles to accumulate, which grow in mass and volume with increasing height. By growing in size within the ridges, the air can displace water, which forces water into movement. Therefore, depending on how quickly and effectively air can be accumulated in the ridges, larger ridges could provide greater pumping. Without the ridges, the air accumulates in a sheet and pumping can be limited. Lastly, the ridges in the turbine provide additional structural integrity to the apparatus.

The inlet to the apparatus is designed to allow water of specific density and/or quality to enter and be accelerated out the face. The inlet can be located at various points along the turbine and at the ends of the turbine. In one embodiment of the invention, the inlet is located in a position where it receives liquid from the uppermost surface layers of a reservoir. In another embodiment, the inlet draws liquid from a deeper depth in the reservoir. The inlet can also be adjustable from one position to another, allowing for mixing different depths.

The face or opening of the turbine is of a specific area and position to maximize the pumping rate of the turbine. In one embodiment, the opening positioning and/or area can be adjustable. The opening is specifically sized and positioned to minimize backflow of water back into the turbine.

The turbine is designed in a way that allows it to float in the water when the air is off, and held down in the water when the air is on. This can be accomplished with floats of a specific size/volume and weight/density, and/or anchor weights. In one embodiment, the position of the turbine in the water can be adjusted up and down to select which depth the effluent is directed.

A turbine can be connected to another turbine or turbines to form unique configurations and mixing scenarios. They can be positioned back-to-back, one next to another in a chain-like fashion, in a grid, square, or rectangular configuration, or any possible combination. The bottom of the assembled configuration could be open or closed off to an extent. By having the ability to connect multiple units together, unique mixing patterns or currents within a reservoir can be achieved. In one embodiment of the invention, the turbines are used to create currents in a reservoir consistent with the Coriolis Effect. Units can be connected together, particularly in a square/rectangular configuration, where one or more "faces" facilitate currents in specific outward directions while one or more "faces" facilitate water from outside the grid into the rectangular grid itself.

An example of this would be a floating rectangular turbine that has one or more sides that pull water from the surface outside the rectangular turbine and directs it into the turbine so that floating debris outside the turbine can be confined. In one embodiment, corralled debris is utilized for treatment purposes. Corralled Duckweed being used to remove nutrients is an example of such an embodiment. All four sides of the turbine could be used to pump water into the containment zone—or one, more, or all sides could be used to pump water outward from the turbine. It also can allow for increased mixing or influence in a reservoir. This ability to interconnect with other units is a specific embodiment of the invention. It should also be noted that economies can be achieved by consolidating functions of multiple like devices. Examples of this might include having one common air feed header, one common blower to feed several units, and so forth.

The turbine is generally fed with air from a blower that preferentially resides on the shore. This allows for simple maintenance for the blower. The blower sends pressurized air through a hose to a header that distributes the air to the inside of the turbine. Once in the turbine, the air can be released through diffusers, nozzles, or any appropriate orifice. Sometimes the air can be released in a nozzle that is directed in a way that facilitates rapid movement of water within the turbine. Sometimes the air can be released as fine bubbled that can provide enhanced oxygen transfer to microbes. Sometimes that air can be fed intermittently. The goal of the air is to facilitate movement of water within the turbine, and a secondary benefit is its ability to transfer oxygen to the water.

The turbine is preferentially made to be light in weight for simple installation and extraction of the unit in the water. However, it is also preferred that the turbine be designed in such a way that minimizes the need for maintenance.

The window(s) or face(s) in the turbine can be designed to minimize collection of debris on the window and minimal headloss. This might include slanted or sloped edges, or components like rope material that can be actuated to release trapped debris. The window(s) of the turbine may incorporate an extension that facilitates water to a specific depth or characteristic (i.e., laminar flow). These extensions may be used to inhibit water from migrating to other depths within the water column.

The turbine may have some sort of bracing to maintain structural integrity. This could include the use of cables that wrap around a unit or brace one turbine with another, or possibly rigid tubing or piping. However, it is preferred that the bracing material used not impede the movement of water to and through the unit, nor present a location for debris to agglomerate. In some cases, the bracing may also function as an air header or other function.

It is preferred that the turbine be made of corrosion resistant materials, and preferentially light in weight so as to minimize installation labor and costs.

Gas-Distributing Device

Liquid treatment systems of the present invention may further comprise at least one gas-distributing device (also referred to herein as a "corrugated aerator"). Desirably, the gas-distributing device of the present invention is a portable, expandable, and non-fouling aerator made out of flexible air diffusers (i.e., also referred to herein as "air-permeable tubular members") and corrugated material, typically corrugated plastic pipe (i.e., also referred to herein as a "base substrate" or "base tubular member"). The ridges and valleys of the base pipe may serve important functions in the fabrication, operation, and maintenance of the aerator. The aerator is light and easily deployed from the shore, where a compressor/blower provides process air. Multiple aerators can be connected together to form various configurations of aeration in a basin, like in a line ("curtain") or several units in parallel, for example.

The ridges and valleys of the corrugated pipe are utilized in a favorable way in the fabrication, operation, and maintenance of the unit. Flexible air diffusers can be mounted to the top of the ridges where the neighboring crevices are left open to facilitate unobstructed water flow. The air diffusers can also be mounted in the crevices/valleys where they can be shielded from moving debris in the water. In either case, it is preferred to seal the gap/space between the air diffuser and the corrugations, preventing or limiting the passage of water around the air diffuser. This ensures the diffusers remain open and free of debris that could otherwise wrap around the diffuser.

By releasing air through diffusers on the ridges, a unique airlift pump is created. Air released from the diffuser(s) extends outward and above the neighboring crevices around the pipe, creating density and pressure gradients in the water around the pipe. Water in the crevices is drawn up into the "bubble bed" where pressures are lower and water is rising. As the water is displaced upward, new water from around the aerator is drawn in. Each "valley" of the corrugations becomes a channel for water movement. With no obstructions in the "valley", water is free to move through the corrugations towards the top of the center and top of the aerator. The introduction of air through diffusers at varying depths is a specific embodiment of the invention. This allows for air to be introduced into the water column at different rates, creating maximum oxygen transfer efficiencies.

The aerator is designed so that it can be submerged to select depths. This can be done by making the aerator of sufficient weight to sink, but then suspending the aerator from buoyant material (e.g., floats) that stop it from sinking beyond a select depth. This depth can be adjustable. An alternative way to set the aerator at the desired depth is to make the aerator buoyant and utilize anchor weights to leverage and pull to submergence. The aerator can utilize the interior of the pipe as a ballast tank where water and air displace each other making more or less submergence. One can liken this to a submarine moving up and down in the water. The aerator can also utilize the interior of the pipe as a conduit for additional pumping/mixing of liquid. The aerator is preferentially kept in a vertical position and ballast is positioned accordingly. One embodiment places this ballast/weight inside the pipe in the center, 6:00 position. Another one places it outside the pipe. The air manifold may function as a baseframe for the unit. The floats that suspend the unit in the water from the surface may take on many forms, including bouys, floating plastic pipes, corrugated plastic pipes, and so forth. The floats may contribute to enhancing the mixing effect of the unit by directing lifting water and air outward away from the float.

The gas-producing apparatus of the present invention (e.g., an aerator) may have one of more of the following features:

1) the gas-producing apparatus may utilize corrugated material/pipe as a base substrate;
2) the gas-producing apparatus may utilize flexible air-permeable tubular members (e.g., aeration hoses) attached to the corrugations;
3) the gas-producing apparatus may utilize flexible air-permeable tubular members (e.g., aeration hoses) in select positions along the base substrate/corrugations to minimize and/or eliminate potential for fouling by debris;

4) the gas-producing apparatus may utilize flexible air-permeable tubular members (e.g. aeration hoses) positioned in a vertical configuration where variable gas delivery rates may be supplied;

5) the flexible air-permeable tubular members (e.g., aeration hoses) may be sealed to an outer surface of the base substrate so that water/liquid and debris cannot encircle the flexible air-permeable tubular member (e.g., aeration hose);

6) the gas-producing apparatus may create a series of parallel air lift zones/channels at each depression in the corrugations where air is released from flexible air-permeable tubular members (e.g., aeration hoses) mounted on neighboring ridges (e.g., via a glue and/or mechanical means, e.g., plastic ties);

7) the gas-producing apparatus may have a ballast that not only sinks the gas-producing apparatus in water, but keeps the gas-producing apparatus at a desired vertical position (e.g., one or more pieces of rebar, or other metal cable/rod-like materials may be used as weights, for example, along a length of the base substrate, e.g., within a base substrate (at a 6:00 o'clock position) in the form of a tubular member);

8) the gas-producing apparatus may be held in position/depth by attaching the gas-producing apparatus to floats at the surface that prevent it from sinking beyond a select depth;

9) the gas-producing apparatus may be held in position/depth by attaching the gas-producing apparatus to a float(s) (e.g., a floating pipe extending along the length of the base substrate, e.g., a floating pipe (e.g., a 4-6 in. diameter pipe) that encompasses an air/gas supply line (e.g., a 1-2 in. diameter air/gas supply line) with t-shaped connector(s) therein so that air/gas may be supplied to each gas-producing apparatus within a series of multiple gas-producing apparatus) at the surface that acts to direct water away from the float thereby enhancing mixing in the body of liquid;

10) the base substrate may be used as a means to accomplish mixing of the surrounding liquid by enacting pumping of liquid through the base substrate; and 11) the gas-producing apparatus may be raised to the surface by injecting air into the base substrate.

Additional Embodiments:

Methods of Treating a Liquid Reservoir

1. A method of treating a reservoir of water, said method comprising the steps of: identifying a reservoir requiring treatment; positioning at least one current inducing apparatus into said reservoir; allowing said current inducing apparatus to create movement of water at the surface of the reservoir, and beneath the surface to a depth substantially limited to the depth of sunlight penetration, thereby forming a sunlit treatment zone; monitoring said reservoir for a desired outcome; introducing water and nutrients from beneath this treatment zone up into the treatment zone on an as-desired basis to achieve a preferred overall reservoir water quality; and ceasing said introduction of water and/or nutrients into the treatment zone when said desired outcome is achieved, and/or ceasing operation of current inducing device when said desired outcome is achieved.

2. The method of embodiment 1, further comprising: utilizing said currents to facilitate movement of floating debris so that it can be concentrated, contained, or processed in some way and no longer problematic to reservoir water quality.

3. A method of treating a reservoir of water comprising the steps of: identifying a reservoir requiring treatment; positioning at least one wave inducing apparatus into said reservoir; monitoring the water quality characteristics of the reservoir; allowing said wave inducing apparatus to create waves of sufficient size/amplitude to affect light penetration and/or heat transfer into the reservoir; allowing said wave inducing apparatus to create waves of sufficient size/amplitude at specific times and or environmental conditions to facilitate a desired water quality in the reservoir; and ceasing operation of wave producing apparatus when desired water quality in the reservoir is achieved.

4. A method of treating a liquid reservoir, said method comprising: generating a current in the liquid reservoir having a reservoir depth $D_r$, wherein the current (i) travels in a non-linear path across an upper surface of the liquid reservoir, and (ii) moves liquid within a liquid treatment zone having a depth $D_{tz}$ with depth $D_{tz}$ being less than reservoir depth $D_r$.

5. A method of treating a liquid reservoir, said method comprising: creating waves along an upper surface of the liquid reservoir, the waves having a wave height relative to the upper surface, wherein the liquid reservoir has a reservoir depth $D_r$, and the waves move liquid within a liquid treatment zone having a depth $D_{tz}$ with depth $D_{tz}$ being less than reservoir depth $D_r$.

6. The method of embodiment 4, said method further comprising: creating waves along the upper surface of the liquid reservoir, the waves having a wave height relative to the upper surface, wherein waves move liquid within the liquid treatment zone having a depth $D_{tz}$.

7. The method of embodiment 5, said method further comprising: generating a current in the liquid reservoir, wherein the current (i) travels in a non-linear path across the upper surface of the liquid reservoir, and (ii) moves liquid within the liquid treatment zone.

8. The method of any one of embodiments 4 to 7, wherein liquid treatment zone depth $D_{tz}$ is less than ½ of the reservoir depth $D_r$.

9. The method of any one of embodiments 4 to 8, wherein liquid treatment zone depth $D_{tz}$ is substantially equal to a depth in which sunlight can penetrate (i.e., a photosynthesis depth).

10. The method of any one of embodiments 4 and 6 to 9, wherein the current travels in a semi-circular path across the upper surface of the liquid reservoir.

11. The method of any one of embodiments 4 and 6 to 10, wherein the current travels in a circular path across the upper surface of the liquid reservoir.

12. The method of any one of embodiments 4 and 6 to 11, further comprising: positioning one or more current-producing devices to as to produce the current across the upper surface of the liquid reservoir.

13. The method of any one of embodiments 5 to 12, further comprising: positioning one or more wave-producing devices to as to produce the waves across the upper surface of the liquid reservoir.

14. The method of any one of embodiments 4 and 5 to 13, wherein said generating step further comprises strategically starting or stopping current generation based on one or more factors selected from time of day, weather conditions, liquid temperature, or any combination thereof 15. The method of any one of embodiments 5 to 14, wherein said creating step further comprises strategically starting or stopping wave creation based on one or more factors selected from time of day, weather conditions, liquid temperature, or any combination thereof.

16. The method of any one of embodiments 4 to 15, further comprising: collecting debris from the upper surface of the liquid reservoir.

17. The method of any one of embodiments 4 to 16, further comprising: positioning one or more floating media devices on the upper surface of the liquid reservoir.

18. The method of embodiment 17, wherein the one or more floating media devices are capable of (i) providing one or more nutrients into the liquid reservoir, (ii) transferring heat to the liquid reservoir, (iii) monitoring one or more properties of the liquid reservoir, (iv) absorbing solar energy for later use via one or more solar panels thereon, (v) moving via a sail-like member extending above the upper surface of the liquid reservoir, or (vi) any combination of (i) to (v).

19. The method of any one of embodiments 4 to 18, further comprising: adding one or more nutrients into the liquid treatment zone.

20. The method of embodiment 19, wherein the one or more nutrients comprise air, oxygen, nitrogen, algae, a surfactant, or any combination thereof.

21. The method of any one of embodiments 4 to 20, further comprising: positioning one or more gas-distributing devices within the liquid reservoir.

22. The method of any one of embodiments 4 to 21, wherein the liquid reservoir comprises water.

23. The method of any one of embodiments 4 to 22, wherein the liquid reservoir comprises water and water treatment chemicals.

24. The method of any one of embodiments 4 to 22, wherein the liquid reservoir consists essentially of water and water treatment chemicals.

25. The method of any one of embodiments 4 to 22, wherein the liquid reservoir consists of water and water treatment chemicals.

Floating Media Device Embodiments:

26. The floating media device of embodiment 17 or 18.

27. Float(s) used to enhance mixing effect of rising water/air mixture as described herein.

Current-Generating Device Embodiments:

28. Current-producing devices/apparatus as described herein.

Wave-Generating Device Embodiments:

29. Wave-generating devices/apparatus as described herein.

Figure 1:
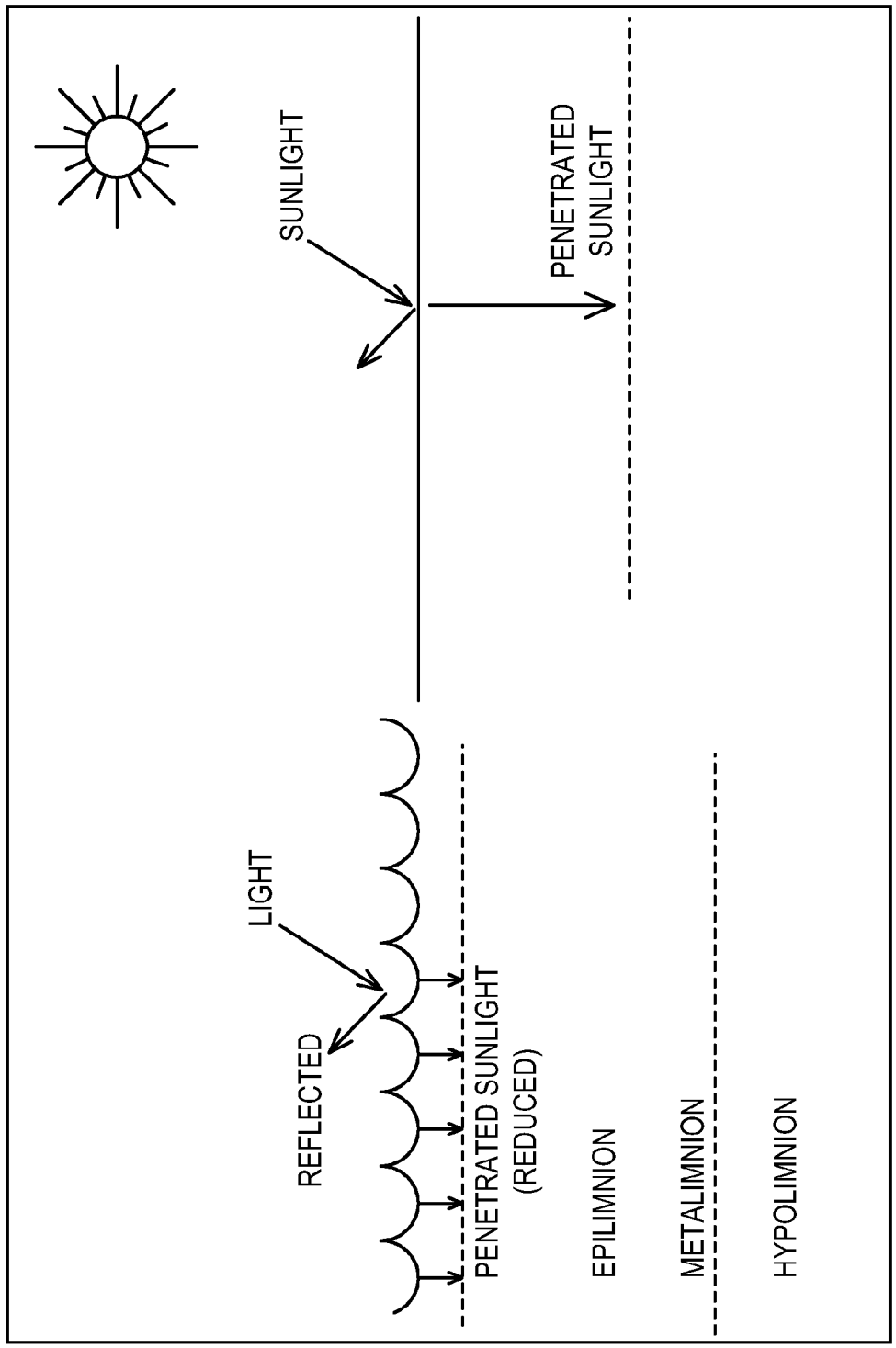
FIG. 1 depicts an exemplary reservoir limnology.

Gas-Distributing Apparatus Embodiments:

30. A gas-distributing apparatus 10 suitable for use in a liquid reservoir (e.g., exemplary liquid reservoir 100 shown in FIG. 1), said apparatus 10 comprising: a base substrate 11 having a base substrate length $L_{bs}$, a base substrate width $W_{bs}$ substantially perpendicular to said base substrate length $L_{bs}$, and a base substrate outer surface 113; one or more gas-supplying manifolds 13 extending (i) proximate to or in contact with and (ii) along said base substrate length $L_{bs}$ of said base substrate 11, each of said gas-supplying manifolds 13 comprising at least one gas-supplying manifold inlet 131 and at least one gas-supplying manifold outlet 132; and two or more air-permeable tubular members 12 positioned along said base substrate outer surface 113 in a substantially parallel configuration relative to each another, each of said air-permeable tubular members 12 being in fluid communication with said at least one gas-supplying manifold outlet 132 of said one or more gas-supplying manifolds 13.

Figure 23:
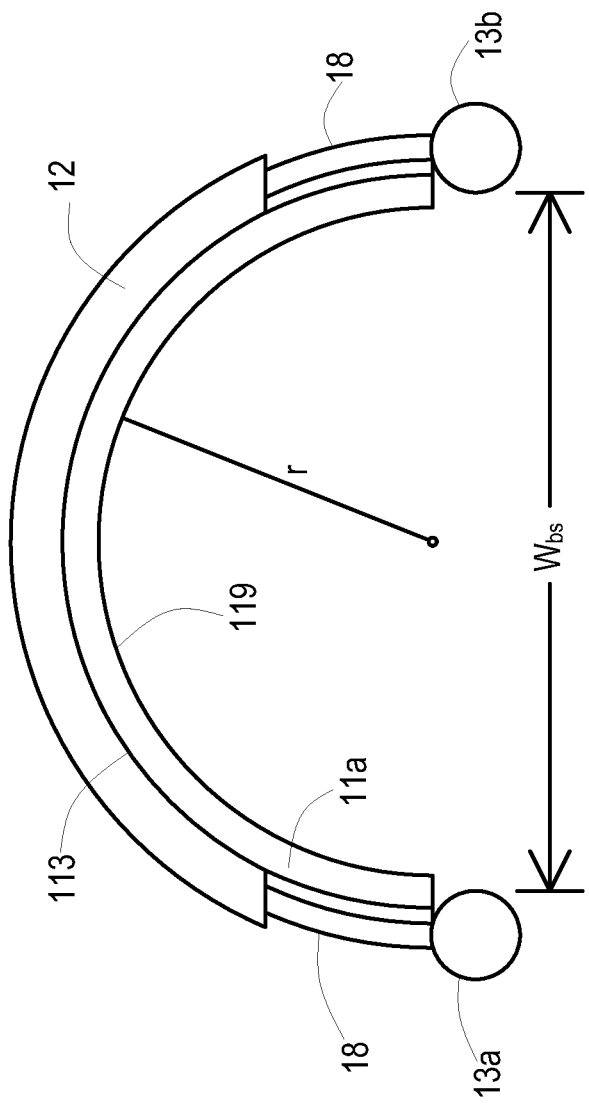
FIG. 23 depicts an end view of another exemplary gas-distributing apparatus suitable for use in the liquid treatment systems of the present invention.
Figure 24:
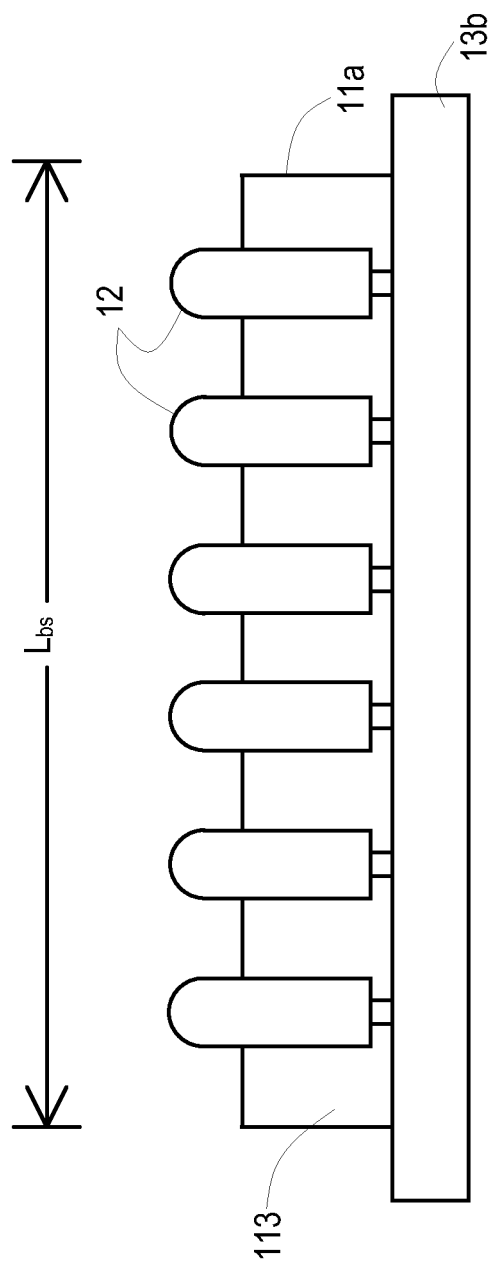
FIG. 24 depicts a side view of the exemplary gas-distributing apparatus shown in FIG. 23.

31. The gas-distributing apparatus 10 of embodiment 30, wherein said base substrate 11 comprises a base tubular member section 11a having (i) a substantially straight base substrate length $L_{bs}$, and (ii) a radius of curvature r within said base substrate 11 along said base substrate width $W_{bs}$ (see, FIGS. 23-24).

32. The gas-distributing apparatus 10 of embodiment 31, wherein said base substrate 11, when viewed perpendicularly to said base substrate width $W_{bs}$ and along said base substrate length $L_{bs}$, has a semi-circular shape (see again, FIG. 23).

33. The gas-distributing apparatus 10 of embodiment 30, wherein said base substrate 11 comprises a base tubular member 11b having a base tubular member volume 114 and a base tubular member inner surface 112 opposite said base substrate outer surface 113.

Figure 2:
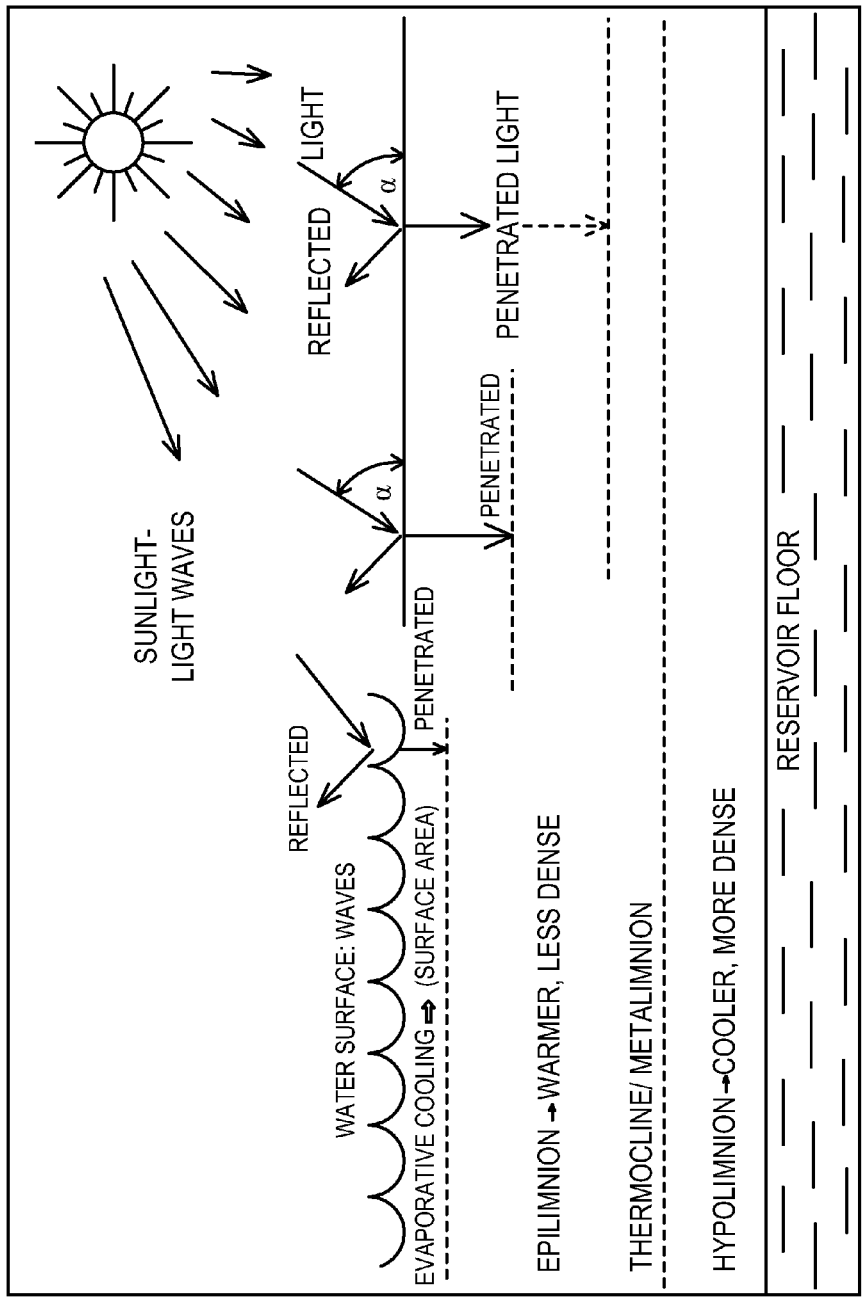
FIG. 2 depicts the effect of waves on sunlight penetration.
Figure 3:
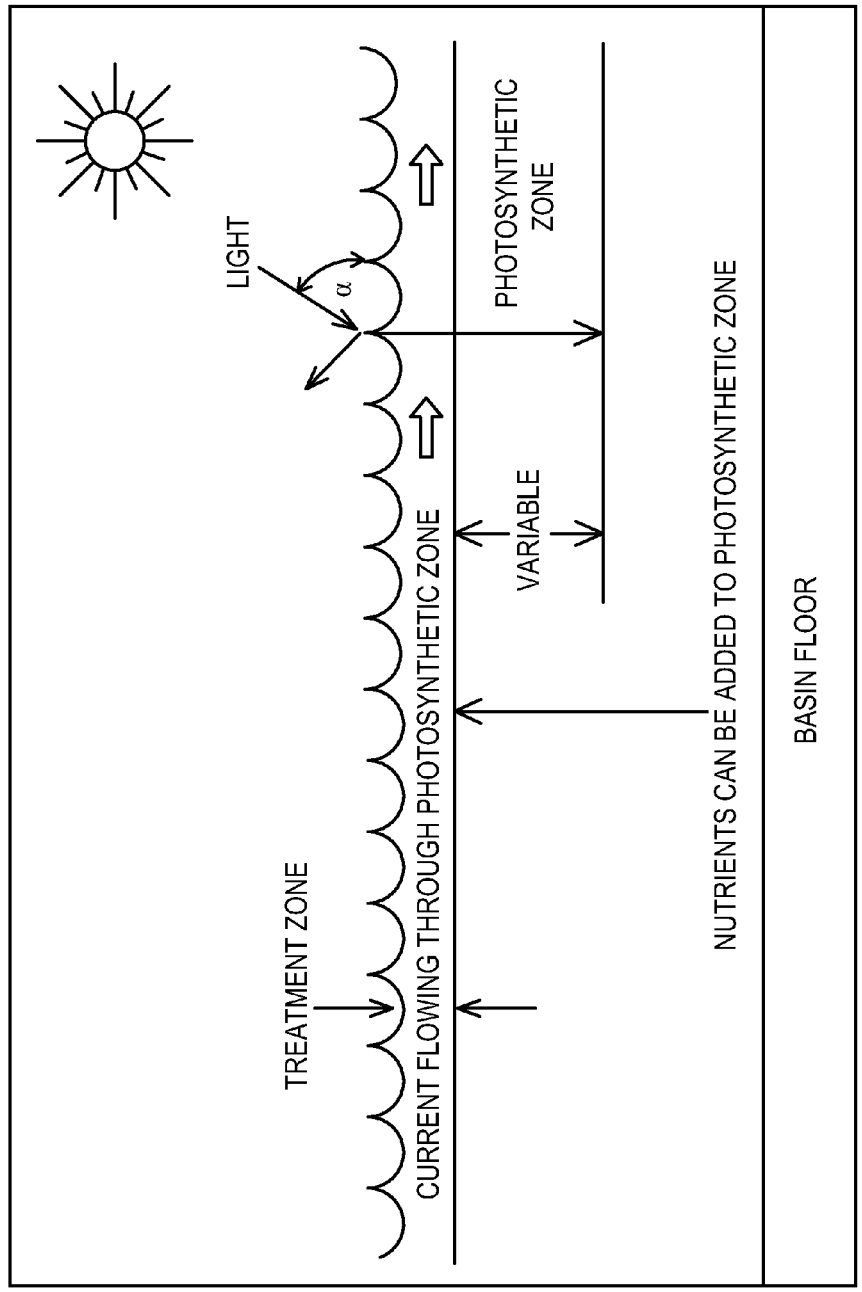
FIG. 3 depicts the establishment of an exemplary treatment zone.

34. The gas-distributing apparatus 10 of embodiment 33, wherein said base tubular member 11b has (i) an outer circular cross-sectional area, and (ii) an inner circular cross-sectional area bound by said base tubular member inner surface 112 when viewed perpendicularly to said base substrate width $W_{bs}$ (see, for example, FIGS. 1-2).

35. The gas-distributing apparatus 10 of any one of embodiments 30 to 34, wherein said base substrate 11 further comprises a corrugated surface configuration comprising alternating valleys 117 and ridges 118 extending along said base substrate width $W_{bs}$ and substantially perpendicular to said base substrate length $L_{bs}$.

36. The gas-distributing apparatus 10 of embodiment 35, wherein said two or more air-permeable tubular members 12 are positioned (i) within said valleys 117, (ii) within said ridges 118, or (iii) within said valleys 117 and said ridges 118.

37. The gas-distributing apparatus 10 of embodiment 35 or 36, wherein said two or more air-permeable tubular members 12 are positioned within said valleys 117.

38. The gas-distributing apparatus 10 of any one of embodiments 35 to 37, wherein said two or more air-permeable tubular members 12 are positioned within said ridges 118.

39. The gas-distributing apparatus 10 of any one of embodiments 30 to 38, wherein said one or more gas-supplying manifolds 13 comprises two gas-supplying manifolds 13a and 13b, each of which (1) extends (i) proximate to or in contact with and (ii) along said base substrate length $L_{bs}$ of said base substrate 11, and (2) comprises at least one gas-supplying manifold inlet 131 and at least one gas-supplying manifold outlet 132.

40. The gas-distributing apparatus 10 of embodiment 39, wherein said two gas-supplying manifolds 13a and 13b are in fluid communication with one another via at least one gas-supplying manifold connector 135, each gas-supplying manifold connector 135 extending (i) proximate to or in contact with and (ii) along said base substrate width $W_{bs}$ of said base substrate 11.

41. The gas-distributing apparatus 10 of embodiment 39 or 40, wherein said two gas-supplying manifolds 13a and 13b are in fluid communication with one another via two gas-supplying manifold connectors 135 positioned at opposite ends of said base substrate 11.

42. The gas-distributing apparatus 10 of any one of embodiments 39 to 41, wherein at least one gas-supplying manifold connector 135 further comprises said at least one gas-supplying manifold inlet 131.

Figure 21:
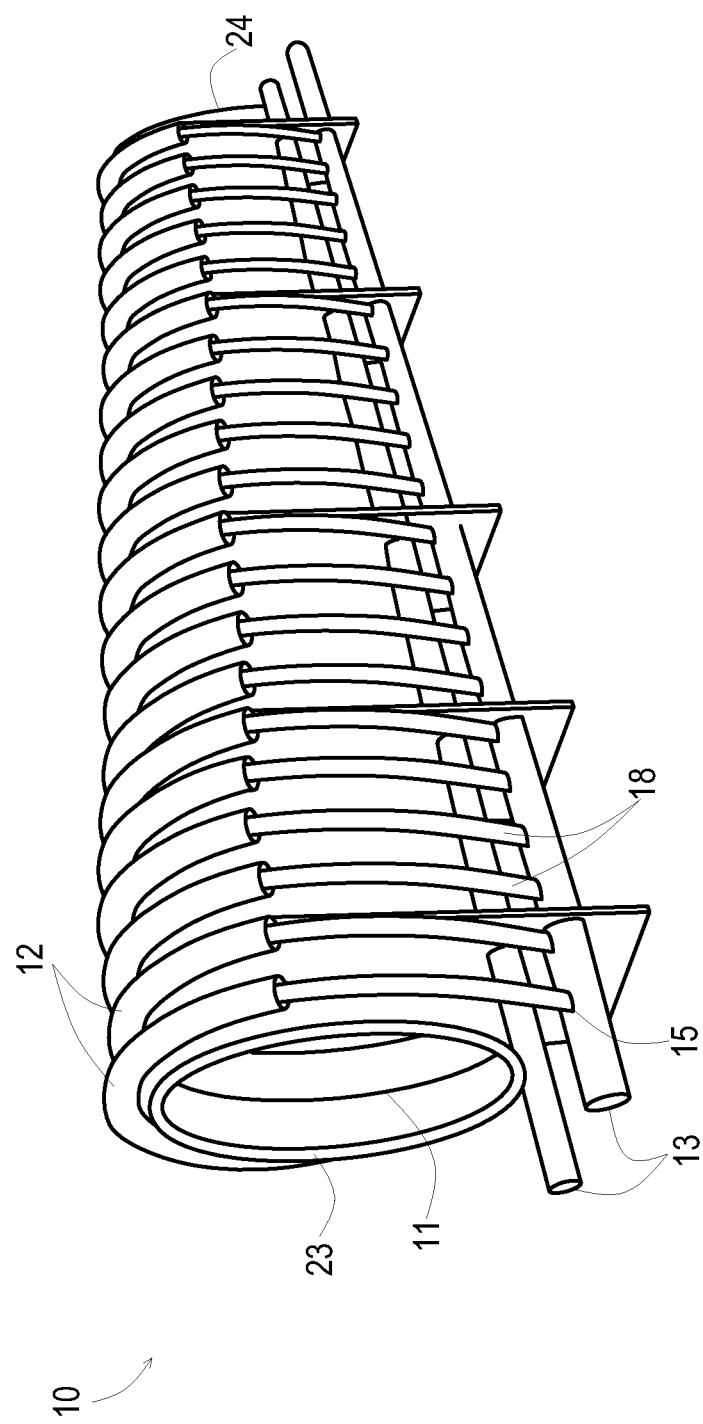
FIG. 21 depicts a perspective view of another exemplary gas-distributing apparatus suitable for use in the liquid treatment systems of the present invention.
Figure 22:
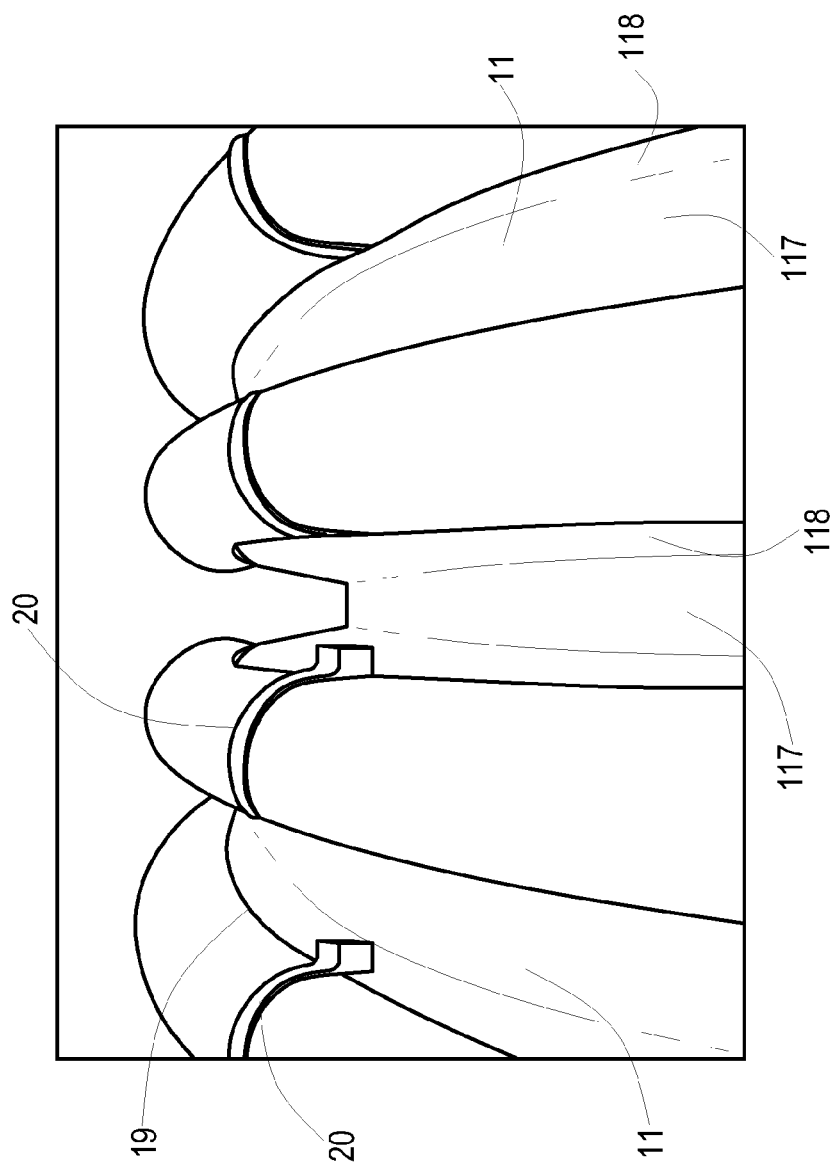
FIG. 22 depicts a side close-up view of an exemplary outer surface of an exemplary gas-distributing apparatus of the present invention with air-permeable tubular members spaced thereon.

43. The gas-distributing apparatus 10 of any one of embodiments 39 to 42, wherein each gas-supplying manifold connector 135 further independently comprises a gas-supplying manifold inlet 131.
44. The gas-distributing apparatus 10 of any one of embodiments 39 to 43, wherein each gas-supplying manifold connector 135 comprises a T-shaped conduit 135.
45. The gas-distributing apparatus 10 of any one of embodiments 39 to 44, wherein said one or more gas-supplying manifolds 13 has an overall rectangular configuration with a manifold length $L_m$ and a manifold width $W_m$.
46. The gas-distributing apparatus 10 of embodiment 45, wherein said manifold length $L_m$ is greater than said base substrate length $L_{bs}$, and said manifold width $W_m$ is substantially equal to or greater than said base substrate width $W_{bs}$.
47. The gas-distributing apparatus 10 of any one of embodiments 30 to 46, wherein said one or more gas-supplying manifolds 13 is in contact with said base substrate 11.
48. The gas-distributing apparatus 10 of any one of embodiments 30 to 47, wherein said one or more gas-supplying manifolds 13 is in contact with said base substrate outer surface 113.
49. The gas-distributing apparatus 10 of any one of embodiments 30 to 48, wherein said two or more air-permeable tubular members 12 comprise from about 2 up to and including about 100 air-permeable tubular members 12, in increments of 1, or any number of air-permeable tubular members 12 between 2 and 100 (e.g., 36), or any range of numbers between 2 and 100 (e.g., from about 28 to about 40).
50. The gas-distributing apparatus 10 of any one of embodiments 30 to 49, wherein said two or more air-permeable tubular members 12 comprise from about 30 to about 60 air-permeable tubular members 12.
51. The gas-distributing apparatus 10 of any one of embodiments 30 to 50, wherein each of said two or more air-permeable tubular members 12 independently extends an air-permeable tubular member length $L_{tm}$ along said base substrate outer surface 113, and each air-permeable tubular member length $L_{tm}$ is independently (i) less than, (ii) equal to or (iii) greater than said base substrate width $W_{bs}$.
52. The gas-distributing apparatus 10 of any one of embodiments 30 to 51, wherein each of said two or more air-permeable tubular members 12 independently extends an air-permeable tubular member length $L_{tm}$ along said base substrate outer surface 113, and each air-permeable tubular member length $L_{tm}$ is independently greater than said base substrate width $W_{bs}$.
53. The gas-distributing apparatus 10 of any one of embodiments 33 to 52, wherein each of said two or more air-permeable tubular members 12 independently extends an air-permeable tubular member length $L_{tm}$ along said base substrate outer surface 113, and each air-permeable tubular member length $L_{tm}$ is independently greater than about 60% of an overall circumference of said base tubular member 11b.
54. The gas-distributing apparatus 10 of any one of embodiments 30 to 53, wherein each of said two or more air-permeable tubular members 12 comprises a tubular foam member 12.
55. The gas-distributing apparatus 10 of any one of embodiments 30 to 54, wherein each of said two or more air-permeable tubular members 12 comprises a tubular foam member 12 comprising a rubber or plastic material, possibly containing recycled material(s).
56. The gas-distributing apparatus 10 of any one of embodiments 30 to 55, wherein each of said two or more air-permeable tubular members 12 is connected to each of said one or more gas-supplying manifolds 13.
57. The gas-distributing apparatus 10 of any one of embodiments 30 to 56, wherein each of said one or more gas-supplying manifolds 13 comprises a gas-supplying manifold outlet 132 for each of said two or more air-permeable tubular members 12.
58. The gas-distributing apparatus 10 of any one of embodiments 30 to 57, wherein each of said one or more gas-supplying manifolds 13 further comprises a gas-supplying manifold outlet connector 15 for each of said two or more air-permeable tubular members 12.
59. The gas-distributing apparatus 10 of embodiment 58, wherein each gas-supplying manifold outlet connector 15 comprises a removable threaded connector 15 capable of connecting to a gas-supplying manifold outlet 132.
60. The gas-distributing apparatus 10 of any one of embodiments 30 to 59, further comprising: at least one tubing connector member 18 for each of said two or more air-permeable tubular members 12, each tubing connector member 18 being sized to connect (i) one end of a given air-permeable tubular member 12 to (ii) a given gas-supplying manifold 13 of said one or more gas-supplying manifolds 13 (see, for example, FIG. 21).
61. The gas-distributing apparatus 10 of any one of embodiments 30 to 60, further comprising: two tubing connector members 18 for each of said two or more air-permeable tubular members 12, said two tubing connector members 18 being sized to connect (i) opposite ends of a given air-permeable tubular member 12 to (ii) two gas-supplying manifolds 13a and 13b of said one or more gas-supplying manifolds 13 (see again, for example, FIG. 21).
62. The gas-distributing apparatus 10 of any one of embodiments 30 to 61, further comprising: an adhesive 19 capable of bonding each of said two or more air-permeable tubular members 12 to said base substrate outer surface 113 (see, for example, FIG. 22).
63. The gas-distributing apparatus 10 of any one of embodiments 30 to 62, further comprising: one or more mechanical fasteners 20 capable of attaching (i) at least a portion of a given air-permeable tubular member 12 to said base substrate outer surface 113, (ii) at least a portion of a given gas-supplying manifold 13 to said base substrate outer surface 113, or (iii) both (i) and (ii) (see again, for example, FIG. 22).
64. The gas-distributing apparatus 10 of embodiment 63, wherein each mechanical fastener 20 extends thru said base substrate 11 in at least one location and encircles (i) said air-permeable tubular member 12, (ii) said gas-supplying manifold 13, or (iii) both said air-permeable tubular member 12 and said gas-supplying manifold 13.
65. The gas-distributing apparatus 10 of any one of embodiments 30 to 64, wherein at least one of said one or more gas-supplying manifolds 13 further comprises one or more secondary gas outlets (not shown) positioned between adjacent air-permeable tubular members 12, said one or more secondary gas outlets providing one or more gas outlets that are not in fluid communication with said two or more air-permeable tubular members 12.
66. The gas-distributing apparatus 10 of any one of embodiments 30 to 65, wherein said base substrate 11 comprises a polymeric material.
67. The gas-distributing apparatus 10 of any one of embodiments 30 to 66, wherein said base substrate 11 comprises high density polyethylene (HDPE), fiberglass, any other plastic, or combinations thereof 68. The gas-distributing apparatus 10 of any one of embodiments 30 to 67, wherein said one or more gas-supplying manifolds 13 comprises a polymeric material.

69. The gas-distributing apparatus 10 of any one of embodiments 30 to 68, wherein said one or more gas-supplying manifolds 13 comprises PVC, plastic, copper, or steel pipe.

70. The gas-distributing apparatus 10 of any one of embodiments 33 to 69, further comprising base tubular member end caps 22 sized to seal opposite end openings 23 and 24 of said base tubular member 11.

71. The gas-distributing apparatus 10 of embodiment 70, wherein at least one of (i) said base tubular member end caps 22 and (ii) said base tubular member 11 further comprises an air inlet (not shown) that allows said base tubular member 11 to be filled with air when desired.

72. The gas-distributing apparatus 10 of embodiment 70 or 71, further comprising: at least one valve (not shown) positioned between an air source (not shown) and said base tubular member 11.

73. The gas-distributing apparatus 10 of any one of embodiments 30 to 72, further comprising one or more weights (not shown), each weight being sized so as to assist in submergence of said gas-distributing apparatus 10 within a body of liquid.

74. The gas-distributing apparatus 10 of embodiment 73, wherein said one or more weights are substantially equally distributed along said base substrate length $L_{bs}$.

75. The gas-distributing apparatus 10 of embodiment 73 or 74, wherein each of said one or more weights comprises a metal cable or rod.

76. The gas-distributing apparatus 10 of any one of embodiments 73 to 75, wherein each of said one or more weights is positioned along (i) a lower surface 119 of said base substrate 11 or (ii) said base tubular member inner surface 112.

77. The gas-distributing apparatus 10 of any one of embodiments 30 to 76, further comprising one or more floats (not shown), each float being sized so as to assist in positioning of said gas-distributing apparatus 10 a desired depth within a body of liquid.

78. The gas-distributing apparatus 10 of embodiment 77, wherein said one or more floats comprises a float at opposite ends of said base substrate length $L_{bs}$.

79. The gas-distributing apparatus 10 of embodiment 77, wherein said one or more floats are substantially equally distributed along said base substrate length $L_{bs}$.

80. The gas-distributing apparatus 10 of any one of embodiments 77 to 79, further comprising: a float connector (e.g., a cable or rope) (not shown) dimensioned so as to connect a given float to (i) said base substrate 11, (ii) said one or more gas-supplying manifolds 13, or (iii) both (i) and (ii).

81. The gas-distributing apparatus 10 of any one of embodiments 30 to 80, wherein said base substrate length $L_{bs}$ ranges from about 1.0 foot (ft) to about 100 ft, and said base substrate width $W_{bs}$ ranges from about 1.0 ft to about 10 ft.

82. The gas-distributing apparatus 10 of any one of embodiments 30 to 81, wherein said base substrate length $L_{bs}$ ranges from about 5.0 ft to about 20.0 ft, and said base substrate width $W_{bs}$ ranges from about 1.0 ft to about 6.0 ft.

83. The gas-distributing apparatus 10 of any one of embodiments 30 to 82, wherein said base substrate length $L_{bs}$ is about 10.0 ft, and said base substrate width $W_{bs}$ is about 1.2 ft.

84. The gas-distributing apparatus 10 of any one of embodiments 30 to 83, further comprising: a gas supply conduit system (not shown) sized so as to connect (1) a gas source to (ii) said one or more gas-supplying manifolds 13.

85. The gas-distributing apparatus 10 of any one of embodiments 30 to 84, further comprising: a gas source (not shown).

86. The gas-distributing apparatus 10 of any one of embodiments 30 to 85, further comprising: a gas source comprising an air blower.

87. The gas-distributing apparatus 10 of any one of embodiments 72 to 86, wherein said air source and said gas source are the same source that comprises an air blower.

Methods of Making Gas-Distributing Apparatus Embodiments:

88. A method of making the gas-distributing apparatus 10 of any one of embodiments 30 to 87, said method comprising: positioning two or more air-permeable tubular members 12 along the base substrate outer surface 113 in a substantially parallel configuration relative to each another along the base substrate 11; positioning one or more gas-supplying manifolds 13 (i) proximate to or in contact with and (ii) along the base substrate length $L_{bs}$ of the base substrate 11, each of the gas-supplying manifolds 13 comprising at least one gas-supplying manifold inlet 131 and at least one gas-supplying manifold outlet 132; connecting each of the two or more air-permeable tubular members 12 to at least one of the one or more gas-supplying manifolds 13 so as to be in fluid communication with one another; and optionally connecting (i) the two or more air-permeable tubular members 12 to the base substrate outer surface 113, (ii) the one or more gas-supplying manifolds 13 to the base substrate 11, or (iii) both (i) and (ii).

89. The method of embodiment 88, wherein said method further comprises: connecting the two or more air-permeable tubular members 12 to the base substrate outer surface 113.

90. The method of embodiment 89, wherein said connecting step comprises adhesively bonding the two or more air-permeable tubular members 12 to the base substrate outer surface 113.

91. The method of embodiment 89 or 90, wherein said connecting step comprises mechanically attaching at least portions of each of the two or more air-permeable tubular members 12 to the base substrate outer surface 113 (i.e., via mechanical fasteners 20 shown in FIG. 22).

92. The method of any one of embodiments 89 to 91, wherein said connecting step further comprises utilizing one or more mechanical fasteners 20 to extend thru said base substrate 11 and encircle at least a portion of each of the two or more air-permeable tubular members 12 so as to attach the two or more air-permeable tubular members 12 to the base substrate 11.

93. The method of any one of embodiments 88 to 92, wherein said method further comprises: connecting the one or more gas-supplying manifolds 13 to the base substrate 11.

94. The method of embodiment 93, wherein said connecting step comprises utilizing one or more mechanical fasteners 20 to extend thru said base substrate 11 and encircle at least a portion of the one or more gas-supplying manifolds 13 so as to attach the one or more gas-supplying manifolds 13 to the base substrate 11.
95. The method of any one of embodiments 88 to 94, wherein said positioning one or more gas-supplying manifolds 13 comprises positioning two gas-supplying manifolds 13a and 13b (i) proximate to or in contact with and (ii) along the base substrate length $L_{bs}$ of the base substrate 11.
96. The method of embodiment 95, connecting the two gas-supplying manifolds 13 to one another via one or more gas-supplying manifold connectors 135.
97. The method of embodiment 95 or 96, wherein said positioning one or more gas-supplying manifolds 13 comprises forming a rectangular-shaped gas-supplying manifold 13 comprising (i) the two gas-supplying manifolds 13a and 13b and (ii) two gas-supplying manifold connectors 135a and 135b connecting opposite ends of the two gas-supplying manifolds 13a and 13b to one another.
98. The method of any one of embodiments 88 to 97, further comprising: one or more cutting steps wherein (i) the base substrate 11, (ii) the two or more air-permeable tubular members 12, (iii) the one or more gas-supplying manifolds 13, or (iv) any combination of (i) to (iii) are each independently cut to desired dimensions.
99. The method of any one of embodiments 88 to 98, further comprising: incorporating one or more weights into the gas-producing apparatus 10.
100. The method of any one of embodiments 88 to 99, further comprising: attaching one or more floats to the gas-producing apparatus 10.
101. The method of any one of embodiments 88 to 100, further comprising: providing a gas source capable of supplying gas to the gas-producing apparatus 10.
102. The method of any one of embodiments 88 to 101, further comprising: providing a gas source capable of supplying gas to the one or more gas-supplying manifolds 13.
103. The method of any one of embodiments 88 to 102, further comprising: providing a gas supply conduit system (not shown) sized so as to connect (i) a gas source to (ii) the one or more gas-supplying manifolds 13.

Methods of Using Gas-distributing Apparatus Embodiments:

104. A method of using the gas-distributing apparatus 10 of any one of embodiments 30 to 87, said method comprising: positioning one or more gas-distributing apparatus 10 of any one of embodiments 30 to 87 within a body of liquid (not shown); and forcing a gas thru the gas-distributing apparatus 10 into the body of liquid.
105. The method of embodiment 104, said positioning step comprising positioning two or more gas-distributing apparatus 10 of any one of embodiments 30 to 87 within the body of liquid.
106. The method of embodiment 104 or 105, said positioning step comprising positioning the one or more gas-distributing apparatus 10 at a desired depth within the body of liquid.
107. The method of any one of embodiments 104 to 106, said positioning step comprising positioning the one or more gas-distributing apparatus 10 at a desired depth so that all of the two or more air-permeable tubular members 12 are completely submerged within the body of liquid.
108. The method of any one of embodiments 104 to 107, said positioning step comprising positioning the one or more gas-distributing apparatus 10 along a floor of the body of liquid.
109. The method of any one of embodiments 104 to 108, wherein the body of liquid comprises water.
110. The method of any one of embodiments 104 to 109, wherein the body of liquid comprises a wastewater lagoon, aeration basin, waste treatment tank, industrial waste pond, or any other application requiring aeration.
111. The method of any one of embodiments 104 to 110, wherein the gas comprises air or oxygen, such as pure oxygen being delivered to a wastewater process.
112. The method of any one of embodiments 104 to 111, further comprising: removing one or more gas-distributing apparatus 10 from the body of water.
113. The method of any one of embodiments 105 to 112, further comprising: removing one or more of the two or more gas-distributing apparatus 10 while a remaining number of the two or more gas-distributing apparatus 10 continue to provide gas to the body of water.
114. The method of any one of embodiments 104 to 113, further comprising: performing maintenance (e.g., cleaning) on any gas-distributing apparatus 10 removed from the body of water.
115. The method of any one of embodiments 104 to 114, further comprising: filling the base substrate 11 with air so as to cause the base substrate 11 to float to an upper surface of the body of water.
116. The method of any one of embodiments 104 to 115, further comprising: pumping a liquid through the base substrate 11 so that the liquid enters one end of the base substrate 11 and exits an opposite end of the base substrate 11.
117. The method of embodiment 116, wherein the base substrate 11 comprises a base tubular member 11b.
118. A method of using the gas-distributing apparatus 10 of any one of embodiments 30 to 87 to provide nutrients in liquid/water reservoir treated in the methods of any one of embodiments 1 to 25.

It should be understood, of course, that the foregoing relates to exemplary embodiments of the invention and that modifications may be made without departing from the spirit and scope of the invention as set forth in the following claims. By way of example, the currents could be established in a way that compliments the flows and momentum of water entering and leaving a reservoir. For example, if a creek or river flows into a lake, you could not place the devices that establish the treatment zone in a way that directly opposes the water entering the reservoir. Also, the currents could be established in a way that prevents water from short-circuiting in a reservoir. The water from below the treatment zone could be "bled" from the reservoir via hypolimnetic release. This could drop the net nutrient levels of the entire lake. Also, the currents can be enacted only at certain times of the day and/or night, or times of the year. Also, the waves could be established to be of a specific minimum height or angle ensuring minimum surface angles to the sun. Also, a minimum or maximum number of wave-makers may be required. Finally, the frequencies of the waves could be specific. It should also be understood that ranges of values set forth inherently include those values, as well as all increments between.

It should be understood that although the above-described system components, such as gas-distributing apparatus 10, and methods are described as "comprising" one or more components, features or steps, the above-described system components and methods may "comprise," "consists of," or "consist essentially of any of the above-described components and/or features and/or steps of the system components and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of or "consisting of or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a gas-distributing apparatus 10 and/or method that "comprises" a list of elements (e.g., components or features or steps) is not necessarily limited to only those elements (or components or features or steps), but may include other elements (or components or features or steps) not expressly listed or inherent to the gas-distributing apparatus 10 and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of and "consisting essentially of" are used to define system component (e.g., gas-distributing apparatus 10) and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described system components (e.g., gas-distributing apparatus 10) and/or methods may comprise, consist essentially of, or consist of any of the herein-described components and features, as shown in the figures with or without any additional feature(s) not shown in the figures. In other words, for example, in some embodiments, the gas-distributing apparatus 10 and/or method of the present invention may have any additional feature that is not specifically shown in the figures. In some embodiments, the system component (e.g., gas-distributing apparatus 10) and/or method of the present invention does not have any additional features other than those (i.e., some or all) shown in the figures, and such additional features, not shown in the figures, are specifically excluded from the system component (e.g., gas-distributing apparatus 10) and/or method.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Preparation of An Exemplary Gas-Distributing Apparatus

Gas-distributing apparatus similar to exemplary gas-distributing apparatus 10 shown in FIGS. 15-24 were prepared and utilized to provide air/oxygen to various bodies of water in a number of water treatment centers.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A gas-distributing apparatus suitable for use in a liquid reservoir, said apparatus comprising:
    a base substrate having a base substrate length, a base substrate width substantially perpendicular to said base substrate length, and a base substrate outer surface;
    one or more gas-supplying manifolds extending (i) proximate to or in contact with and (ii) along said base substrate length of said base substrate, each of said gas-supplying manifolds comprising at least one gas-supplying manifold inlet and at least one gas-supplying manifold outlet; and
    two or more air-permeable tubular members positioned along said base substrate outer surface in a substantially parallel configuration relative to each another, each of said air-permeable tubular member being in fluid communication with said at least one gas-supplying manifold outlet of said one or more gas-supplying manifolds.

2. The gas-distributing apparatus of claim 1, wherein said base substrate comprises a base tubular member having a base tubular member volume and a base tubular member inner surface opposite said base substrate outer surface, wherein said base tubular member has (i) an outer circular cross-sectional area, and (ii) an inner circular cross-sectional area bound by said base tubular member inner surface when viewed perpendicularly to said base substrate width.

3. The gas-distributing apparatus of claim 2, wherein said base substrate further comprises a corrugated surface configuration comprising alternating valleys and ridges extending along said base substrate width and substantially perpendicular to said base substrate length.

4. The gas-distributing apparatus of claim 3, wherein said two or more air-permeable tubular members are positioned (i) within said valleys, (ii) within said ridges, or (iii) within said valleys and said ridges.

5. The gas-distributing apparatus of claim 4, wherein said two or more air-permeable tubular members are positioned within said ridges.

6. The gas-distributing apparatus of claim 1, wherein said one or more gas-supplying manifolds comprises two gas-supplying manifolds, each of which (1) extends (i) proximate to or in contact with and (ii) along said base substrate length of said base substrate, and (2) comprises at least one gas-supplying manifold inlet and at least one gas-supplying manifold outlet.

7. The gas-distributing apparatus of claim 6, wherein said two gas-supplying manifolds are in fluid communication with one another via at least one gas-supplying manifold connector, each gas-supplying manifold connector extending (i) proximate to or in contact with and (ii) along said base substrate width of said base substrate; wherein at least one gas-supplying manifold connector further comprises said at least one gas-supplying manifold inlet; and wherein each gas-supplying manifold connector comprises a T-shaped conduit.

8. The gas-distributing apparatus of claim 7, wherein said one or more gas-supplying manifolds has an overall rectangular configuration with a manifold length and a manifold width; said manifold length is greater than said base substrate length, and said manifold width is substantially equal to or greater than said base substrate width.

9. The gas-distributing apparatus of claim 1, wherein said two or more air-permeable tubular members comprise from about 2 up to and including about 100 air-permeable tubular members.

10. The gas-distributing apparatus of claim 9, wherein each of said two or more air-permeable tubular members independently extends an air-permeable tubular member length $L_{tm}$ along said base substrate outer surface, and each air-permeable tubular member length $L_{tm}$ is independently greater than said base substrate width.

11. The gas-distributing apparatus of claim 9, wherein each of said two or more air-permeable tubular members comprises a tubular foam member.

12. The gas-distributing apparatus of claim 1, wherein each of said two or more air-permeable tubular members is connected to each of said one or more gas-supplying manifolds.

13. The gas-distributing apparatus of claim 1, further comprising:
two tubing connector members for each of said two or more air-permeable tubular members, said two tubing connector members being sized to connect (i) opposite ends of a given air-permeable tubular member to (ii) two gas-supplying manifolds of said one or more gas-supplying manifolds.

14. The gas-distributing apparatus of claim 1, wherein at least one of said one or more gas-supplying manifolds further comprises one or more secondary gas outlets positioned between adjacent air-permeable tubular members, said one or more secondary gas outlets providing one or more gas outlets that are not in fluid communication with said two or more air-permeable tubular members.

15. The gas-distributing apparatus of claim 1, wherein said base substrate comprises high density polyethylene (HDPE), fiberglass, any other polymeric material, or any combination thereof; and said one or more gas-supplying manifolds comprises a polymeric material.

16. The gas-distributing apparatus of claim 1, further comprising one or more weights, each weight being sized so as to assist in submergence of said gas-distributing apparatus within a body of liquid, said one or more weights being substantially equally distributed along said base substrate length.

17. The gas-distributing apparatus of claim 1, further comprising one or more floats, each float being sized so as to assist in positioning of said gas-distributing apparatus a desired depth within a body of liquid; wherein said one or more floats are substantially equally distributed along said base substrate length.

18. The gas-distributing apparatus of claim 17, wherein said one or more floats comprises a floating pipe extending along the length of said base substrate, said floating pipe optionally (i) encompassing a gas supply line therein and (ii) one or more t-shaped connectors therein so that gas may be supplied to each gas-distributing apparatus within a series of connected multiple gas-distributing apparatus.

19. The gas-distributing apparatus of claim 18, further comprising:
a float connector dimensioned so as to connect a given float to (i) said base substrate, (ii) said one or more gas-supplying manifolds, or (iii) both (i) and (ii).

20. The gas-distributing apparatus of claim 1, wherein said base substrate length ranges from about 5.0 ft to about 20.0 ft, and said base substrate width ranges from about 1.0 ft to about 6.0 ft.

\* \* \* \* \*